(12) United States Patent
Kim et al.

(10) Patent No.: US 10,944,304 B2
(45) Date of Patent: Mar. 9, 2021

(54) MOTOR AND MANUFACTURING METHOD THEREOF

(71) Applicant: SAMSUNG ELECTRONICS CO., LTD., Suwon-si (KR)

(72) Inventors: Hong Jung Kim, Suwon-si (KR); Byoung Soo Ko, Seoul (KR); Tae Ho Yoon, Suwon-si (KR); Yong Hyun Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 825 days.

(21) Appl. No.: 15/112,521

(22) PCT Filed: Mar. 25, 2015

(86) PCT No.: PCT/KR2015/002929
§ 371 (c)(1),
(2) Date: Jul. 19, 2016

(87) PCT Pub. No.: WO2015/167124
PCT Pub. Date: Nov. 5, 2015

(65) Prior Publication Data
US 2017/0126085 A1   May 4, 2017

(30) Foreign Application Priority Data

Apr. 28, 2014   (KR) .................. 10-2014-0050595

(51) Int. Cl.
*H02K 3/28* (2006.01)
*H02K 3/48* (2006.01)
(Continued)

(52) U.S. Cl.
CPC ............. *H02K 3/28* (2013.01); *H02K 3/18* (2013.01); *H02K 3/38* (2013.01); *H02K 3/48* (2013.01);
(Continued)

(58) Field of Classification Search
CPC .. H02K 3/28; H02K 3/18; H02K 3/38; H02K 3/48; H02K 3/522; H02K 2203/12
(Continued)

(56) References Cited

U.S. PATENT DOCUMENTS 6,335,582 B1* 1/2002 Abukawa ............... H02K 1/146
 310/156.38
6,404,086 B1* 6/2002 Fukasaku ............... F16F 1/3873
 310/156.08
(Continued)

FOREIGN PATENT DOCUMENTS

DE 10 2007 040 809 A1 3/2009
EP   2207254 A2 7/2010
(Continued)

OTHER PUBLICATIONS

International Search Report (Form PCT/ISA/210); dated Jun. 26, 2015 in corresponding International Patent Application No. PCT/KR2015/002929 (3 pages) (2 pages English Translation).
(Continued)

*Primary Examiner* — Maged M Almawri
(74) *Attorney, Agent, or Firm* — Staas & Halsey LLP

(57) ABSTRACT

Disclosed herein are a motor and a method of manufacturing the motor. The motor includes a rotor, a stator including a plurality of coil bobbin unit groups, and a coil prepared on coil bobbin units by winding a wire sequentially on coil bobbin units of each coil bobbin unit group, cutting the wound wire at a cutting point, connecting one end of the cut wire to a neutral point port, and connecting the other end of the cut wire to a driving point port.

6 Claims, 20 Drawing Sheets

(51) Int. Cl.
*H02K 3/38* (2006.01)
*H02K 3/52* (2006.01)
*H02K 3/18* (2006.01)
*H02K 15/00* (2006.01)
*H02K 15/04* (2006.01)
*H02K 15/095* (2006.01)

(52) U.S. Cl.
CPC ......... *H02K 3/522* (2013.01); *H02K 15/0068* (2013.01); *H02K 15/0435* (2013.01); *H02K 15/095* (2013.01)

(58) Field of Classification Search
USPC .............................. 310/71, 194–208; 29/596
See application file for complete search history.

(56) References Cited

U.S. PATENT DOCUMENTS

| | | | | |
|---|---|---|---|---|
| 10,170,954 | B2* | 1/2019 | Taniguchi | H02K 1/26 |
| 2003/0201688 | A1* | 10/2003 | Yamamura | H02K 3/50 |
| | | | | 310/71 |
| 2006/0022544 | A1* | 2/2006 | Kinashi | H02K 3/28 |
| | | | | 310/179 |
| 2007/0182266 | A1 | 8/2007 | Nashiki et al. | |
| 2009/0189473 | A1* | 7/2009 | Castle | H02K 3/28 |
| | | | | 310/186 |
| 2013/0257200 | A1* | 10/2013 | Nakayama | H02K 5/225 |
| | | | | 310/71 |
| 2015/0303780 | A1* | 10/2015 | Kim | H02K 21/12 |
| | | | | 310/68 B |
| 2016/0352171 | A1* | 12/2016 | Taniguchi | H02K 1/26 |
| 2017/0033630 | A1* | 2/2017 | Tamura | H02K 3/12 |
| 2019/0013710 | A1* | 1/2019 | Kawasaki | H02K 3/18 |

FOREIGN PATENT DOCUMENTS

| | | |
|---|---|---|
| JP | 2000-261990 A | 9/2000 |
| JP | 2007-110848 | 4/2007 |
| JP | 2007-306636 | 11/2007 |
| JP | 2010-154619 A | 7/2010 |
| KR | 10-2006-0041712 | 5/2006 |
| KR | 10-2013-0110772 | 10/2013 |
| WO | WO 2015/167124 A1 | 5/2015 |

OTHER PUBLICATIONS

Written Opinion (Form PCT/ISA/237); dated Jun. 25, 2015 in corresponding International Patent Application No. PCT/KR2015/002929 (4 pages).
European Communication dated Nov. 20, 2018 in European Patent Application No. 15785543.8.
Chinese Office Action dated Jul. 3, 2018 in corresponding Chinese Patent Application No. 201580022815.2.
Extended European Search Report dated Jul. 11, 2017 in related European Patent Application No. 15785543.8 (8 pages).
Chinese Patent Office Action issued in corresponding Chinese Patent Application No. 201580022815.2 dated Mar. 1, 2019.
Chinese Office Action dated Sep. 25, 2019 in Chinese Patent Application No. 201580022815.2.
Korean Office Action dated Oct. 19, 2020 in Korean Patent Application No. 10-2014-0050595.

* cited by examiner

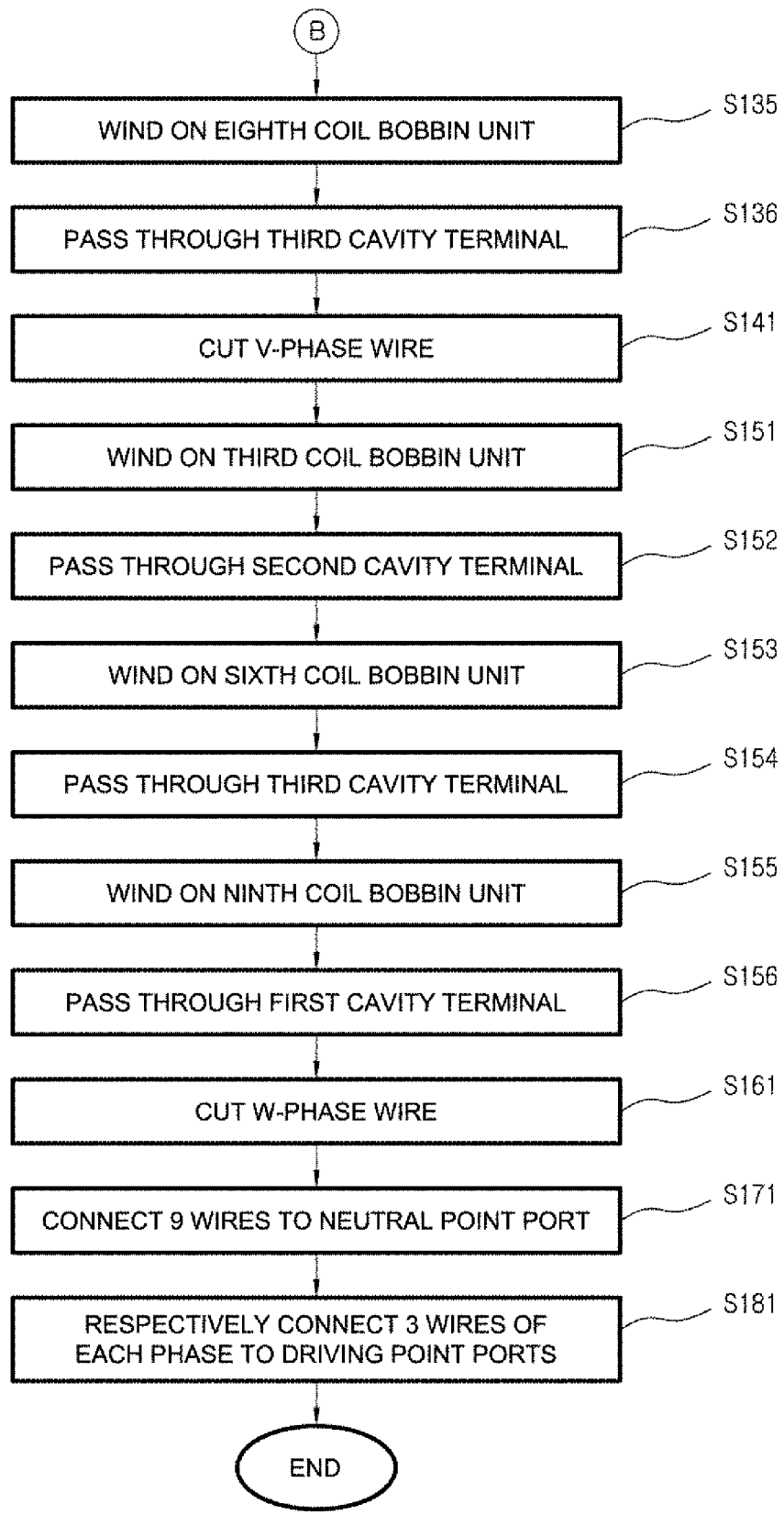

MOTOR AND MANUFACTURING METHOD THEREOF

CROSS-REFERENCE TO RELATED APPLICATIONS

This application is a U.S. national stage application of PCT international application PCT/KR2015/002929, filed on Mar. 25, 2015 and claims the benefit of Korean Patent Application No. 10-2014-0050595, filed on Apr. 28, 2014, respectively, the contents of which are incorporated herein by reference.

TECHNICAL FIELD

Embodiments of the present disclosure relate to a method of manufacturing a motor capable of efficiently organizing wires wound to form coils and simplifying a manufacturing process and a motor manufactured thereby.

BACKGROUND ART

A motor that is a machine capable of converting electrical energy into a rotational force may include a stator and a rotor. The rotor is configured to electromagnetically interact with the stator and may be rotated by a force acting between a magnetic field and current flowing through a coil.

A magnetic field formed for an electromagnetic interaction between the rotor and the stator may include a magnetic field formed by a permanent magnet and a magnetic field formed by current flowing through a coil. The magnetic field formed by the current flowing through the coil may be determined by current flowing in the coil and the number of windings.

DISCLOSURE

Technical Problem

The coil is formed by winding a wire on a coil bobbin unit. In order to wind wires on a plurality of teeth to form coils in a parallel pattern, the wires need to be wound individually on each of the teeth.

In addition, in order to form a plurality of coils arranged in a 3-phase parallel pattern, both ends of each of the plurality of wires drawn out from each of the plurality of teeth need to be connected to driving point ports and neutral point ports. For example, although a 3-phase 9-slot motor includes 9 coils and 18 ends of the wires, the number of ports to which the ends of the wires are connected is limited to 4. Accordingly, a process of connecting the wires drawn out from different positions of the 9 coils toward each port is required, thereby causing a complicated working process.

Therefore, diverse research is being conducted into methods of improving convenience of the manufacturing process of the coil.

Technical Solution

Additional aspects of the disclosure will be set forth in part in the description which follows and, in part, will be obvious from the description, or may be learned by practice of the disclosure.

In accordance with one aspect of the present disclosure, a method of manufacturing a motor includes sequentially winding a wire on each of a plurality of coil bobbin unit groups of a stator, cutting the wire at a cutting point to form a parallel pattern, and connecting one end of the cut wire to a neutral point port and connecting the other end of the cut wire to a driving point port.

The plurality of coil bobbin unit groups may include three coil bobbin unit groups, and each of the coil bobbin unit groups may include at least three coil bobbin units.

The wire may be cut such that the driving point of each coil bobbin unit group is disposed near the coil bobbin unit group.

The wire may be cut at a cutting point adjacent to a first coil bobbin unit of each coil bobbin unit group on which the wire is first wound and a last coil bobbin unit of the coil bobbin unit group on which the wire is last wound.

The winding of the wire may be performed by winding the wire on the last coil bobbin unit of each coil bobbin unit group in a direction opposite to a winding direction of the other coil bobbin units.

The cutting of the wire may be performed by sequentially winding the wire on the plurality of coil bobbin unit groups and cutting the wire. The cutting of the wire may be performed by sequentially winding the wire on one coil bobbin unit group and cutting the wire, and sequentially winding another wire on another coil bobbin unit group.

Among the plurality of coil bobbin unit groups, a first coil bobbin unit group may include a first coil bobbin unit, a fourth coil bobbin unit, and a seventh coil bobbin unit, a second coil bobbin unit group may include a second coil bobbin unit, a fifth coil bobbin unit, and an eighth coil bobbin unit, and a third coil bobbin unit group may include a third coil bobbin unit, a sixth coil bobbin unit, and a ninth coil bobbin unit.

The wire may be wound sequentially on the first coil bobbin unit group, the second coil bobbin unit group, and the third coil bobbin unit group.

The wire may be wound sequentially on the fourth coil bobbin unit, the seventh coil bobbin unit, the first coil bobbin unit, the second coil bobbin unit, the fifth coil bobbin unit, the eighth coil bobbin unit, the third coil bobbin unit, the sixth coil bobbin unit, and the ninth coil bobbin unit.

In accordance with another aspect of the present disclosure, a motor may include a rotor, a stator including a plurality of coil bobbin unit groups, and a coil prepared on coil bobbin units by winding a wire sequentially on coil bobbin units of each coil bobbin unit group, cutting the wound wire at a cutting point, connecting one end of the cut wire to a neutral point port, and connecting the other end of the cut wire to a driving point port.

Advantageous Effects

It is an aspect of the present disclosure to provide a motor in which wires wound to form coils are efficiently organized by changing a pattern of the wires wound in series on a plurality of coil bobbin units into a parallel pattern and a manufacturing method thereof.

DESCRIPTION OF DRAWINGS

These and/or other aspects of the disclosure will become apparent and more readily appreciated from the following description of the embodiments, taken in conjunction with the accompanying drawings of which.

BEST MODE

Figure 1:
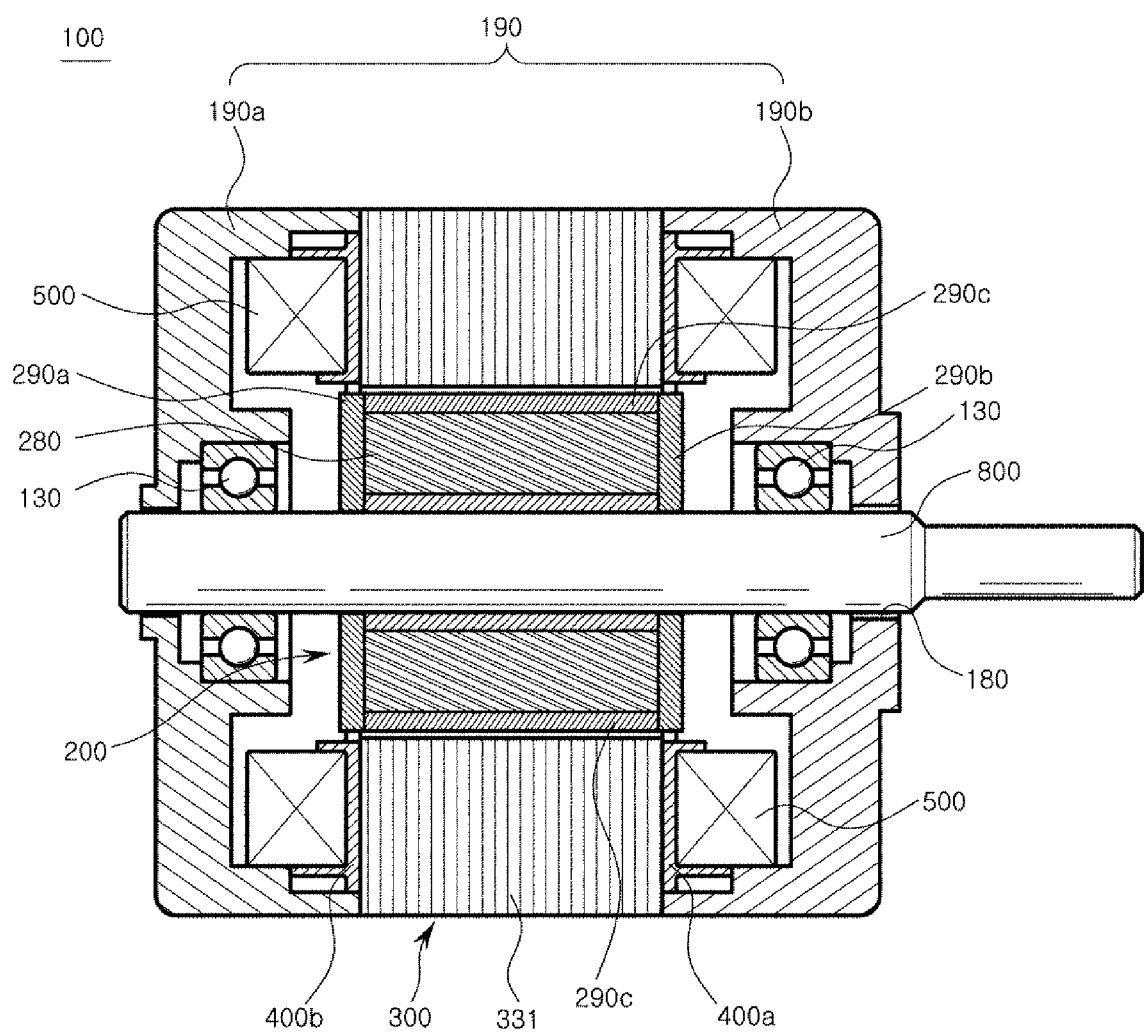
FIG. 1 is a cross-sectional view illustrating a motor in the axial direction according to an embodiment of the present disclosure.

Reference will now be made in detail to the embodiments of the present disclosure, examples of which are illustrated in the accompanying drawings, wherein like reference numerals refer to like elements throughout. However, known functions associated with the present invention or detailed descriptions on the configuration and other matters unnecessarily obscure the gist of the present invention will be omitted.

Further, the following terms, which are defined in consideration of functions of the present invention, may be altered depending on the user's intentions or judicial precedents. If there is no specific definition, the terms should be interpreted as generally interpreted by one of ordinary skill in the art.

Unless defined otherwise, all constituent elements according to aspects and embodiments of the present invention may be combined with each other, if it is obvious to one of ordinary skill in the art that combinations thereof are not technically contradictory, although a single integrated configuration thereof is illustrated in the drawings.

Hereinafter, a motor and a method of manufacturing the motor according to an embodiment of the present disclosure will be described with reference to the accompanying drawings.

A motor according to an embodiment of the present disclosure will be described with reference to FIG. 1.

FIG. 1 illustrates a cross-sectional view of a motor 100 in the axial direction.

The motor 100 may include a motor housing 190, a stator 300, a coil 500, a shaft 800, and a rotor 200.

The motor housing 190 defines an appearance of the motor 100 and is coupled to fixing grooves 337 of the stator 330 providing a fixing force to prevent the stator 330 from rotating.

In addition, the motor housing 190 may be divided into a first motor housing 190a and a second motor housing 190b based on a transverse axis. In addition, the first motor housing 190a and the second motor housing 190b may be connected to the stator 330.

The stator 330 may include a stator core 331 and an insulator 400.

The stator core 331 constitutes a framework of the state 330 maintaining the shape of the stator 330 and may provide a passage in which a magnetic field is formed such that one tooth 332 magnetized by power may lead to induced magnetization of a pair of teeth 332 adjacent to the tooth 332 to have a polarity opposite to that of the tooth 332 magnetized by power.

In addition, the stator core 331 may include a main core 335 functioning as a support frame, teeth 332 on which coil bobbin units 409 of the insulator 400 are disposed, magnetized by driving power, and electromagnetically interacting with a permanent magnet 280 of the rotor 200, slots 333 assisting the flow of a magnetic field formed by the driving power and dividing adjacent teeth 332, and fixing grooves 337 coupled to the motor housing 190 and providing a fixing force to the stator 330.

In addition, the stator core 331 may have a cylindrical shape and may be fabricated by stacking press-processed steel plates. In addition, a plurality of teeth 332 may be disposed at inner portions of the stator core 331 along a circumferential direction, and a plurality of fixing grooves 337 may be disposed at outer portions of the stator core 331. Furthermore, the stator core 331 may have various shapes to maintain the shape of the stator 330 and locate the teeth 332 and the fixing grooves 337 therein.

The stator core 331 may also have a plurality of insertion holes penetrating the stator core 331 in the axial direction. Coupling members such as pins, rivets, or volts may be inserted into the insertion holes to couple the plates constituting the stator core 331.

The stator 330 will be described in more detail with reference to FIGS. 6 to 8.

The insulator 400 is disposed on the stator core 331 to prevent leakage caused when the coil 500 is electrically in contact with the stator core 331. That is, the insulator 400 may include an insulating member to prevent electrical connection between a material having electromagnetic conductivity used to form the stator 330 and the coil 500. The insulator 400 may include a first insulator 400a disposed at an upper portion and a second insulator 400b disposed at a lower portion.

The first insulator 400a and the second insulator 400b are formed of an electrically insulating material and disposed on both sides of the stator core 331 with respect to the axial direction. The first insulator 400a and the second insulator 400b are respectively coupled to both sides of the stator core 331 so as to cover the stator 330.

The first insulator 400a and the second insulator 400b may respectively include a circular frame, a plurality of coil bobbin units 409 arranged to correspond to the stator core 331, and coil guide units protruding inward and outward from the coil bobbin unit 409 in a radial direction.

In addition, since the coil bobbin units 409 are spaced apart from each other in the circumferential direction, space corresponding to each of the slots 333 of the stator 330 may be formed between two adjacent coil bobbin units 409.

The insulator 400 will be described in more detail with reference to FIG. 6.

The first motor housing 190a and the second motor housing 190b may respectively have insertion protrusions for a hermaphroditical coupling with the insertion holes of the stator core 331, such that the first motor housing 190a is coupled to the stator 330 and the second motor housing 190b is coupled to the stator 330. Alternatively, the first motor housing 190a and the second motor housing 190b may respectively have housing through-holes corresponding to the insertion holes of the stator core 331, such that the first motor housing 190a, the second motor housing 190b, and the stator 330 may be connected via one coupling member.

The coil 500 is disposed on the coil bobbin units 409 of the insulator 400 and creates a magnetic field by driving power supplied thereto. In addition, the coil 500 may include a first coil group 501, a second coil group 502, and a third coil group 503.

The coil 500 will be described in more detail with reference to FIGS. 7 and 8.

The shaft 800 may be connected to a shaft insertion hole 334 of the rotor 200 to be rotated simultaneously with the rotor 200. One end of the shaft 800 may be rotatably supported by the second motor housing 190b via a bearing 130, and the other end of the shaft 800 may be rotatably supported by the first motor housing 190a via a bearing 130. In addition, the one end of the shaft 800 supported by the second motor housing 190b may protrude outward from the motor housing 190 through an opening 180 formed in the second motor housing 190b and may be connected to a device requiring a driving force.

The rotor 200, which is a device acquiring a rotational force of the motor 100 by using attraction and repulsion between a magnetic field formed by the permanent magnet 280 and a magnetic field formed in the teeth 332 of the stator 330, is disposed in the stator 330. A first rotor housing 290a and a second rotor housing 290b may be disposed on the lateral surface of the rotor 200, and a third rotor housing 290c may be disposed on the axial surface of the rotor 200.

The rotor 200 may include a rotor core, the permanent magnet 280, and a balancer.

The rotor core may include four permanent magnets 280 in consideration of iron loss due to high-speed drive, switching frequency of an inverter, and other reasons. In addition, the four permanent magnets 280 may be disposed at four first connection grooves of the rotor core such that one of the permanent magnet 280 has a polarity opposite to a pair of permanent magnets 280 adjacent to the permanent magnet 280. The shaft 800 may be inserted into the center of the rotor core.

The rotor core may have a protrusion structure protruding from the center of rotation such that the rotor 200 has a large difference between q-axial inductance and d-axial inductance and additional reluctance torque may be obtained when the rotor 200 is rotated at a speed greater than a preset reference speed. In more detail, the protrusion structure of the rotor core may include a plurality of first connection protrusions protruding toward the circumference from the center of rotation of the rotor core. Each of the plurality of first connection protrusions may protrude toward the circumference of the rotor core to have a fan shape with a larger outer arc length.

Figure 2:
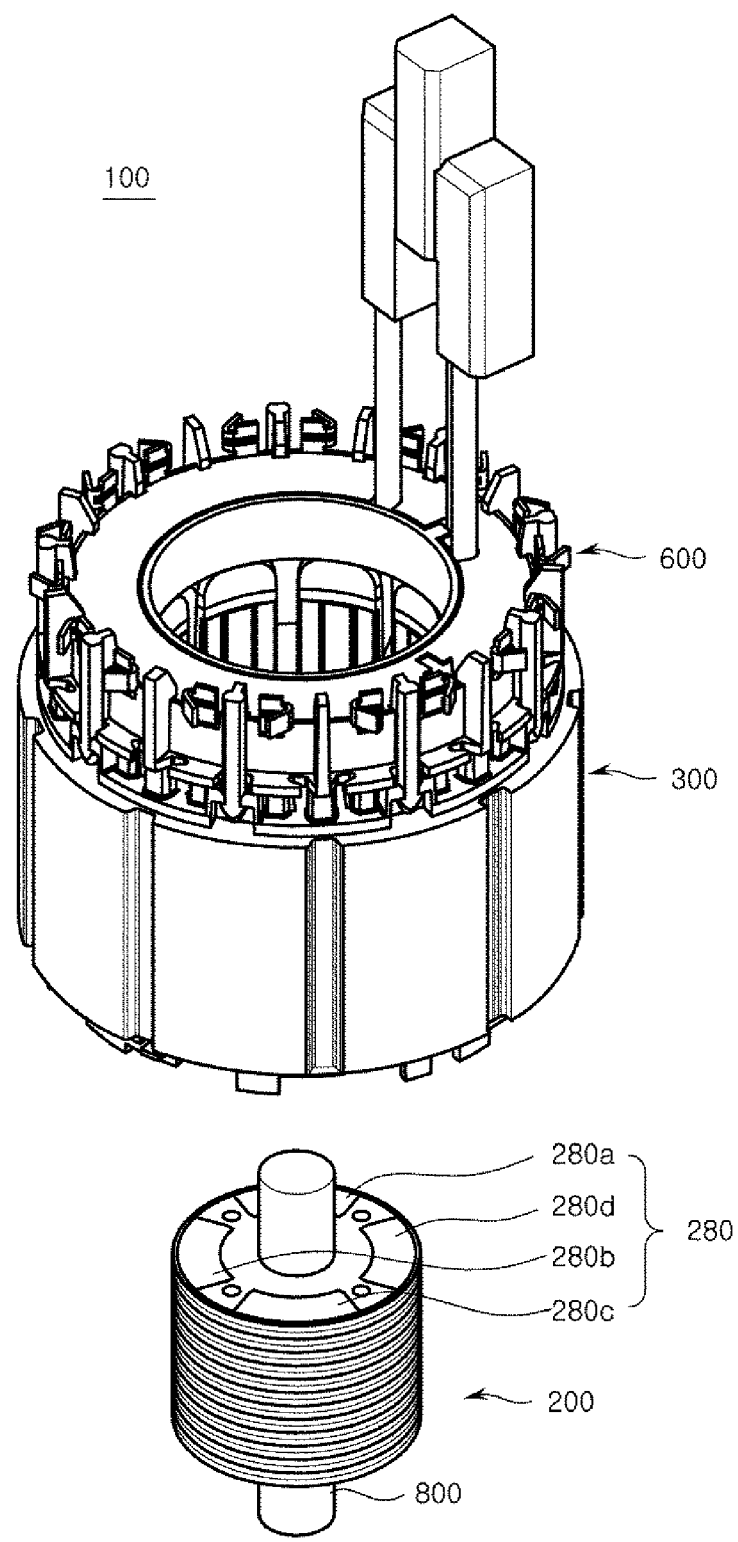
FIG. 2 is a perspective view illustrating a motor including a bus bar according to an embodiment of the present disclosure.
Figure 3:
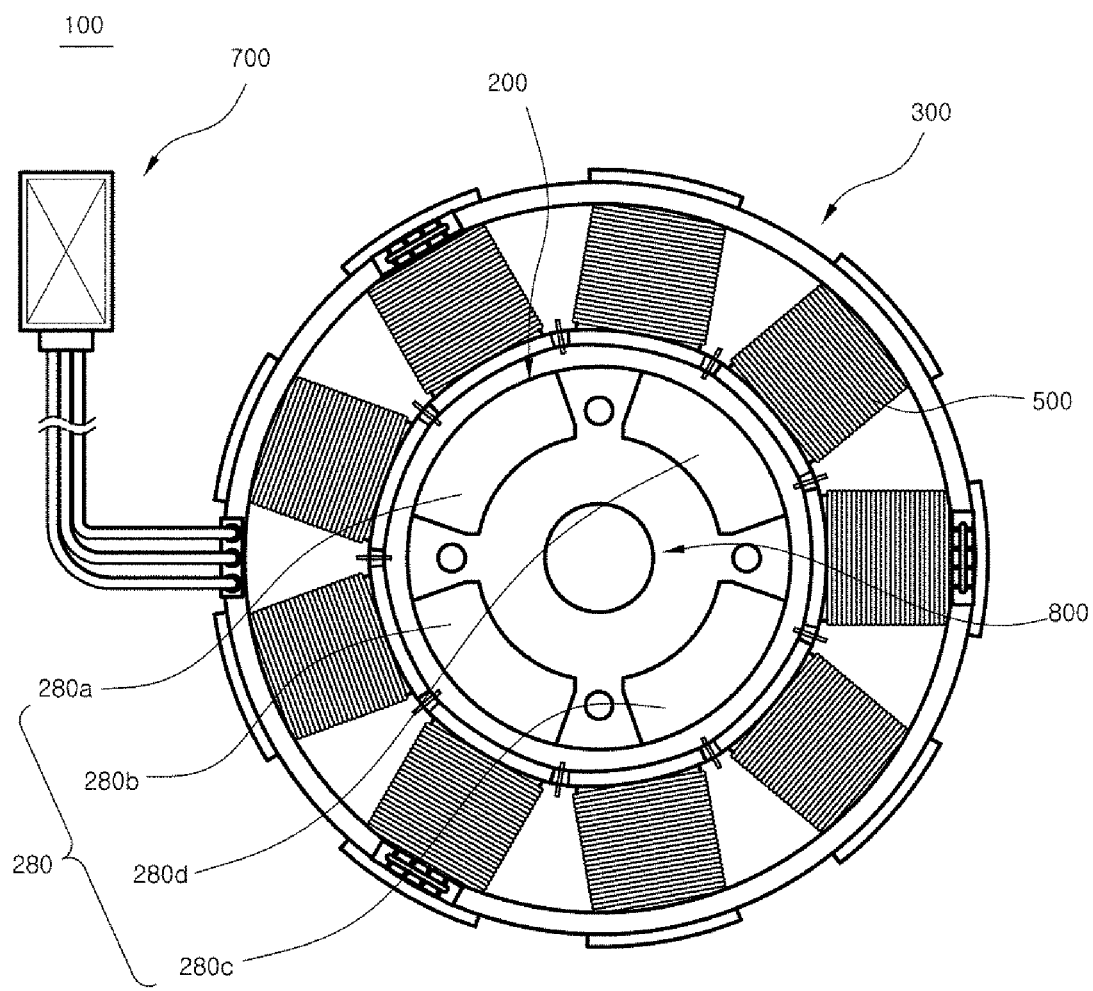
FIG. 3 is a perspective view illustrating a motor including a harness connector assembly according to an embodiment of the present disclosure.

The number of the first connection protrusions may be determined to correspond to the number of the first connection grooves of the rotor core or may be determined to correspond to the number of the permanent magnets 280 (FIGS. 2 and 3). For example, four first connection protrusions may be formed in a protruding shape from the center of rotation toward the circumference to the outer circumferential surface of the rotor core.

A first permanent magnet 280a (FIGS. 2 and 3), a second permanent magnet 280b (FIGS. 2 and 3), a third permanent magnet 280c (FIGS. 2 and 3) and a fourth permanent magnet 280d (FIGS. 2 and 3) may be disposed at four first connection grooves disposed between the four first connection protrusions. In addition, when the first permanent magnet 280a (FIGS. 2 and 3), the second permanent magnet 280b (FIGS. 2 and 3), the third permanent magnet 280c (FIGS. 2 and 3), and the fourth permanent magnet 280d (FIGS. 2 and 3) are coupled to the rotor core, the rotor 200 may have a cross-section including two ring shapes crossing each other.

A direction of magnetization of the permanent magnet 280 (FIGS. 2 and 3) may be a parallel or radial direction. In this regard, a parallel direction of magnetization of the permanent magnet 280 (FIGS. 2 and 3) may be more efficient to realize sinusoidal air-gap flux density distribution.

A balancing structure is a component to balance the rotating rotor 200. The balancing structure may control rotation balance of the rotor 200 including the balancing structure by cutting-processing the balancing structure. The balancing structure may have a circular shape with the same area as that of the cross-section of the rotor 200. The balancing structure may include a first balancer disposed on the top surface of the rotor 200 and a second balancer disposed on the bottom surface of the rotor 200.

Second connection grooves included in the cross-section of the rotor 200 and second connection protrusions included in the balancing structure may be hermaphroditically coupled with each other. In this manner, the rotor 200 and the balancing structure may be coupled with each other. For example, the rotor core may have four second connection grooves. The balancing structure may have four second connection protrusions corresponding to the second connection grooves. The balancing structure and the rotor 200 may be coupled with each other by inserting the second connection protrusions formed in the balancing structure into the second connection grooves of the rotor 200.

A fixing structure may be formed on the outer circumferential surface of the rotor 200 including the rotor core and the permanent magnet 280 coupled with each other. The fixing structure may fix the permanent magnet 280 (FIGS. 2 and 3) coupled with the rotor core not to be displaced. In addition, the fixing structure may be formed of structural steel such as stainless steel (SUS), heat shrinkable tube, high-strength plastic, and the like. Besides, any other material capable of fixing the permanent magnet 280 (FIGS. 2 and 3) coupled with the rotor core not to be displaced therefrom may be used to form the fixing structure.

Hereinafter, a motor including a connection member according to an exemplary embodiment will be described with reference to FIGS. 2 and 3.

FIG. 2 illustrates an appearance of a motor including a bus bar assembly.

A motor 100 may include a rotor 200, a stator 330, and a bus bar assembly 605.

The rotor 200 generates a rotational force via interaction between a magnetic field formed by the permanent magnet 280 disposed in the rotor 200 and a magnetic field formed by driving power supplied to the coil 500 and transmits the generated rotational force to the shaft 800.

Functions, configurations, shapes, and materials of the rotor 200 may be the same as or different from those of the rotor 200 described above with reference to FIG. 1. For example, the rotor 200 illustrated herein may be disposed within the stator 330. However, the position of the rotor 200 is not limited thereto.

The stator 330 is magnetized by a magnetic field formed by driving power supplied to the coil 500, and attraction and repulsion may act between the magnetized stator 330 and the magnetic field formed by the permanent magnet 280 of the rotor 200.

Functions, configurations, shapes, and materials of the stator 330 may be the same as or different from those of the stator 300 described above with reference to FIG. 1. In addition, the stator 330 will be described in more detail with reference to FIGS. 6 to 8.

The bus bar assembly 605 is a connection member 600 configured to connect a driving point P and a neutral point N of a wire led out from the coil 500 are respectively electrically connected to a driving point port PP and a neutral point port NP when coupled to the stator 330.

The bus bar assembly 605 will be described in more detail with reference to FIG. 4.

FIG. 3 illustrates an appearance of a motor including a harness connector assembly.

A motor 100 may include a rotor 200, a stator 330, and a harness connector assembly 700.

The rotor 200 and the stator 330 may be the same as or different from the rotor 200 and the stator 330 described above with reference to FIG. 2.

The harness connector assembly 700 includes harness connector pins 720 coupled to a driving point P and a neutral point N of a wire led out from the coil 500, and the coupled harness connector pins 720 may be coupled to pin mounting portions 710. By using the harness connector assembly 700, the driving point P of the wire led out from the coil 500 may be electrically connected to the driving point port PP and the neutral point N thereof may be electrically connected to the neutral point port NP.

The harness connector assembly 700 will be described in more detail with reference to FIG. 5.

Hereinafter, a connection member according to an exemplary embodiment will be described with reference to FIGS. 4 and 5.

The connection member 600 may include a bus bar assembly 605 and a harness connector assembly 700. However, the connection member 600 is not limited to the bus bar assembly 605 or the harness connector assembly 700, and any other various types of connection members to connect the driving point P and the neutral point N of the coil 500 respectively to the driving point port PP and the neutral point port NP may be used as the connection member 600.

Hereinafter, as examples of the connection member 600, the bus bar assembly 605 and the harness connector assembly 700 will be described.

Figure 4:
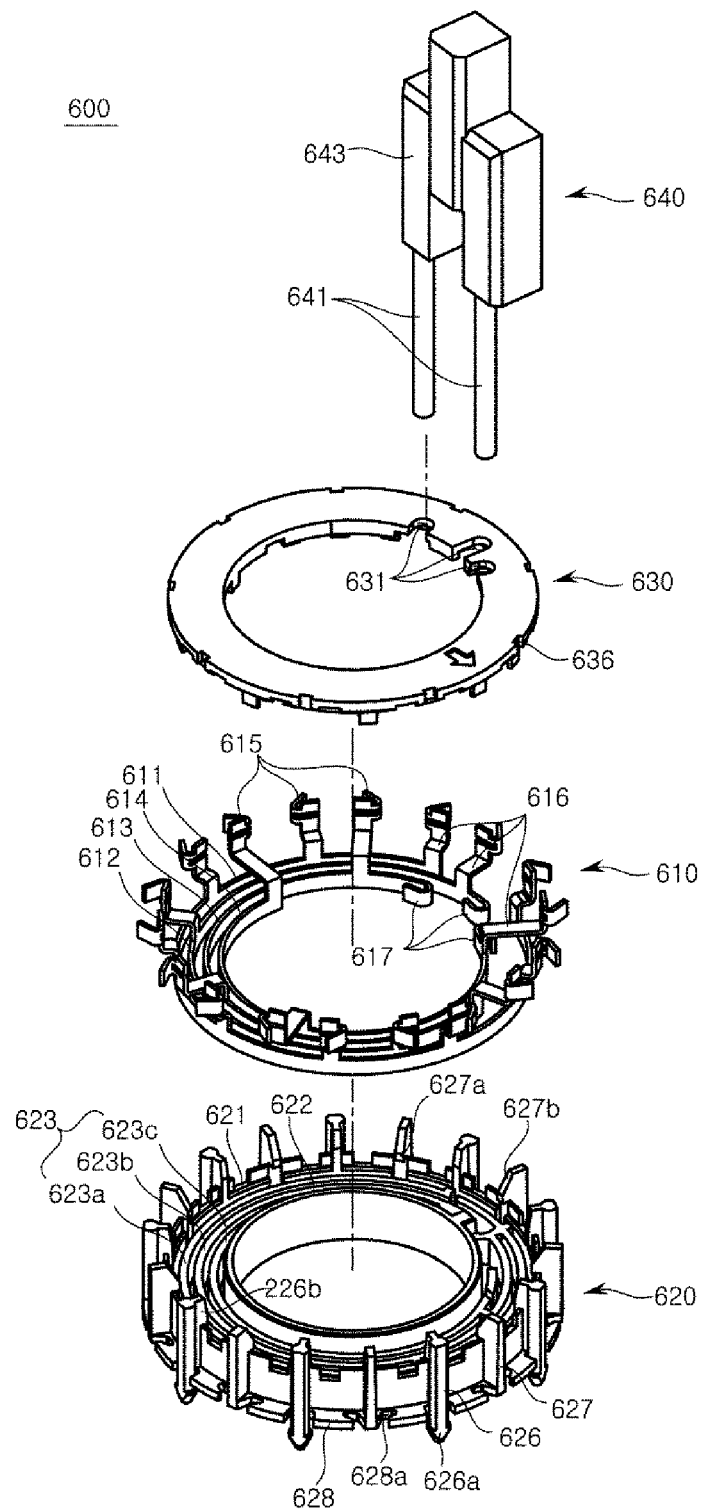
FIG. 4 is an exploded view illustrating a bus bar assembly according to an embodiment of the present disclosure.

FIG. 4 is an exploded view of the bus bar assembly 605.

The bus bar assembly 605 may include a bus bar terminal 640 connecting a wire forming the coil 500 with an external driving circuit, a bus bar group 610 electrically connecting three driving points P and three neutral points N respectively with three driving point ports PP and three neutral point ports NP, a bus bar housing 620 accommodating the bus bar group 610, and a bus bar housing cover 630 covering a top portion of the bus bar housing 620.

The bus bar terminal 640 may include a lead wire 641 extending the coil 500 included in the stator 330 outward and a terminal-binding terminal 643 bound to the external driving circuit.

One end of the lead wire 641 is coupled to the terminal-binding terminal 643, and the other end of the lead wire 641 is coupled to the bus bar housing cover 630.

The terminal-binding terminal 643 is disposed at one end of the lead wire 641 and allows the coil 500 extending outward by the lead wire 641 to be electrically connected to the external driving circuit.

The bus bar group 610 may include a first bus bar 611, a second bus bar 612, a third bus bar 613, and a fourth bus bar 614 having arc shapes of concentric circles. In addition, each of the first to fourth bus bars 611, 612, 613, and 614 may be formed of a conductive material. Also, each of the first to fourth bus bars 611, 612, 613, and 614 may have a width in the central axial direction of the concentric circle greater than a width in a radial direction in order to efficiently form an arc shape.

Each of the first to fourth bus bars 611, 612, 613, and 614 may include a bus bar extension unit 616 extending the coil bobbin unit 409, which is connected to a wire constituting the coil 500 of the stator 330, from each of the first to fourth bus bars 611, 612, 613, and 614 to the outer circumferential surface of the bus bar housing 620, and a terminal coupling unit 617 coupling each of the first to fourth bus bars 611, 612, 613, and 614 with the lead wire 641.

The coil bobbin unit 409 extends from each of the first to fourth bus bars 611, 612, 613, and 614 in a radial direction by the bus bar extension unit 616 and is disposed at an outer side of the bus bar housing 620.

The terminal coupling unit 617 is formed by bending one end of each of the first to fourth bus bars 611, 612, 613, and 614 in a radial and is coupled to the lead wire 641.

The first bus bar 611 has an arc shape of a circle with a first radius and disposed at the outermost portion of the bus bar group 610.

In addition, the first bus bar 611 may constitute a neutral point N of the winding and may include at least 9 neutral point ports NP. For example, when the stator 330 includes 9 teeth 332 and slots 333 and one single wire forms the coil 500 in each tooth 332 of the stator 330 in a parallel winding pattern, the first bus bar 611 may include 9 neutral point ports NP respectively connected to one end of each winding.

The second bus bar 612, the third bus bar 613, and the fourth bus bar 614 respectively have arc shapes of circles with a second radius, a third radius, and a fourth radius. In addition, the second bus bar 612, the third bus bar 613, and the fourth bus bar 614 may be disposed in the order of the second bus bar 612, the third bus bar 613, and the fourth bus bar 614 from the outside of the bus bar group 610, and the fourth bus bar 614 may be disposed at the innermost portion of the bus bar group 610.

The second bus bar 612, the third bus bar 613, and the fourth bus bar 614 may respectively include a U-phase driving point U, a V-phase driving point V, and a W-phase driving point W and may include three driving point ports PP. For example, when the stator 330 includes 9 teeth 332 and slots 333 and one single wire forms the coil 50 in each tooth 332 of the stator 330 in the parallel winding pattern, each of the second bus bar 612, the third bus bar 613, and the fourth bus bar 614 may include 3 driving point ports PP.

The bus bar housing 620 has a hollow cylindrical shape, includes a housing outer wall 621 and a housing inner wall 622, and accommodates the bus bar group 610 between the housing outer wall 621 and the housing inner wall.

The bus bar housing 620 may be formed of a non-conductive material such as a resin to insulate each of the first to fourth bus bars 611, 612, 613, and 614 included in the bus bar group 610.

An annular barrier wall 623 is disposed between the housing outer wall 621 and the housing inner wall 622 to isolate the first bus bar 611, the second bus bar 612, the third bus bar 613, and the fourth bus bar 614 from one another.

The annular barrier wall 623 may include a first annular barrier wall 623a isolating the first bus bar 611 from the second bus bar 612, a second annular barrier wall 623b isolating the second bus bar 612 from the third bus bar 613, and a third annular barrier wall 623c isolating the third bus bar 613 from the fourth bus bar 614.

In addition, the annular barrier wall 623 may have a height greater than those of the first to fourth bus bars 611, 612, 613, and 614 such that the bus bar extension unit 616 extending from each of the first to fourth bus bars 611, 612, 613, and 614 in a radial direction does not contact each of the first to fourth bus bars 611, 612, 613, and 614.

When the bus bar group 610 is mounted in the bus bar housing 620, the first bus bar 611, the second bus bar 612, the third bus bar 613, and the fourth bus bar 614 are disposed in the form of being isolated from one another by the annular barrier wall 623.

In addition, the first bus bar 611, the second bus bar 612, the third bus bar 613, and the fourth bus bar 614 may be insulated from one another by the annular barrier wall 623.

A stator hook bar 626 and a cover hook bar 627 are disposed at the housing outer wall 621 along the outer circumferential surface of the bus bar housing 620, and a first guide plate 628 protruding from the bus bar housing 620 in a radial direction is provided.

The stator hook bar 626 and the cover hook bar 627 are alternately disposed along the outer circumferential surface of the bus bar housing 620, and the first guide plate 628 is disposed between the stator hook bar 626 and the cover hook bar 627.

The stator hook bar 626 is disposed on the surface of the housing outer wall 621 in the central axial direction of the bus bar housing 620.

In addition, a stator hook 626a having a greater diameter than the stator hook bar 626 is disposed at a lower portion of the stator hook bar 626 and couples the bus bar assembly 605 with the stator 330.

Also, a cover guide bar is integrated with the stator hook bar 626 within the stator hook bar 626.

The cover guide bar is disposed to correspond to a cover guide groove 636 formed at the bus bar housing cover 630 and guides the bus bar housing cover 630 such that the bus bar housing cover 630 is located at an appropriate position of the bus bar housing 620.

Similarly to the stator hook bar 626, the cover hook bar 626 is disposed on the surface of the housing outer wall 621 in the central axial direction of the bus bar housing 620.

A cover hook 627a having a cover hook slope 627b is formed at an upper portion of the cover hook bar 627 and couples the bus bar housing cover 630 with the bus bar housing 620.

Particularly, the bus bar housing cover 630 may move toward a binding position along the cover hook slope 627b of the cover hook 627a. While the bus bar housing cover 630 moves toward the binding position along the cover hook slope 627b, the cover hook bar 627 is inclined in a radial direction of the bus bar housing 620.

When the bus bar housing cover 630 arrives at the binding position, the hook bar returns to its original position due to electricity, so that the bus bar housing cover 630 is held by the cover hook 627a.

As such, since the bus bar housing cover 630 is held by the cover hook 627a, the bus bar housing cover 630 is not accidentally separated from the bus bar housing 620.

The first guide plate 628 protrudes from the housing outer wall 621 of the bus bar housing 620 in a radial direction, and a wire guide groove 628a that guides a wire constituting the coil 500 of the stator 330 is disposed at one portion of the first guide plate 628.

The wire guide groove 628a bends a wire constituting the coil 500 of the stator 330 toward the coil bobbin unit 409 of the bus bar. In this regard, the wire guide groove 628a prevents the wire from protruding outward from the stator 330 by bending the wire toward the circumference of the stator 330.

The bus bar housing cover 630 has a hollow annular shape. In addition, the bus bar housing cover 630 may be formed of a non-conductive material as in the bus bar housing 620.

A terminal insertion groove 631 for coupling the bus bar terminal 640 with the bus bar assembly 605 is disposed on the inner circumferential surface of the bus bar housing cover 630 at a position corresponding to the terminal coupling unit 617 of the bus bar group 610. The lead wire 641 of the bus bar terminal 640 is inserted into the terminal insertion groove 631 and coupled to the terminal coupling unit 617 of the bus bar group 610.

The cover guide groove 636 is disposed on the outer circumferential surface of the bus bar housing cover 630 at a position corresponding to the stator hook bar 626 of the bus bar housing 620, so that the bus bar housing cover 630 is mounted at an appropriate position of the bus bar housing 620.

Figure 5:
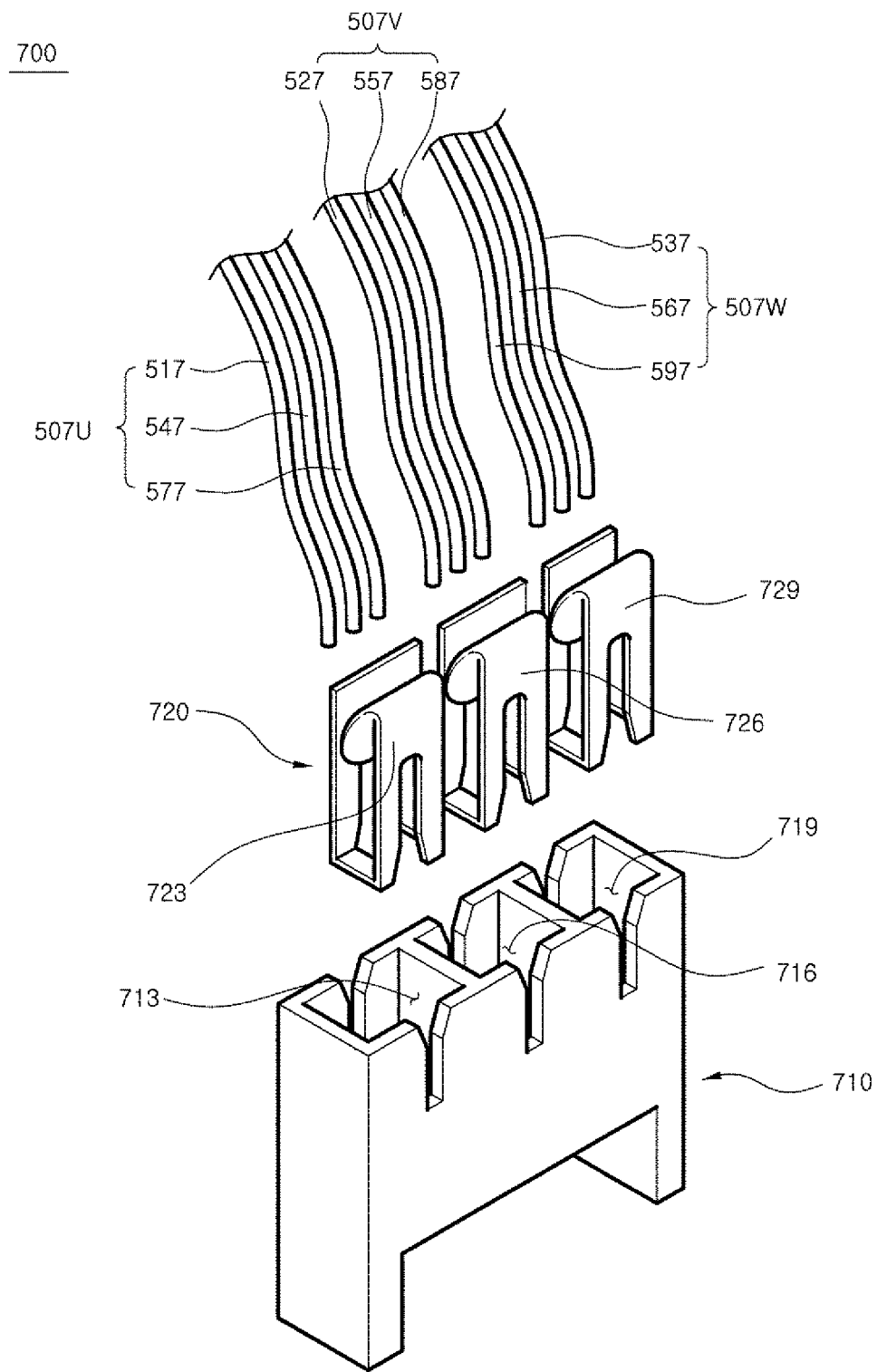
FIG. 5 is an exploded view illustrating a harness connector assembly according to an embodiment of the present disclosure.

FIG. 5 is an exploded view illustrating the harness connector assembly 700.

The harness connector assembly 700 is formed to correspond to a substrate connector attached to a PCB of a driving circuit and is connected to the driving circuit thereby transmitting driving power required to drive the motor 100 to the coil 500. In addition, the harness connector assembly 700 may include a harness connector pin 720 coupled to one end of a wire led out from the coil 500 and a harness connector 710 connected to the substrate connector by fixing the harness connector pin 720.

The harness connector pin 720 may be coupled to the lead wire led out from the coil 500 to fix the lead wire to the harness connector 710.

Particularly, a first coupling protrusion is disposed at one side of the harness connector pin 720, and the first coupling protrusion may be fixed to a first coupling groove disposed at one side of the harness connector 710. In addition, the harness connector pin 720 may be coupled to the lead wire led out from the coil 500 by soldering or by pressing the harness connector pin 720 in which the lead wire is inserted. In addition, various other methods of electrically connecting the harness connector pin 720 with the lead wire while having mechanical stability may also be used to connect the lead wire with the harness connector pin 720.

Also, the harness connector pin 720 may be formed of an electrically conductive material to transmit driving power received from the driving circuit to the lead wire. For example, the harness connector pin 720 may be formed of silver or lead. Various other electrically conductive materials may also be used to form the harness connector pin 720.

The harness connector 710 is formed to correspond to the substrate connector attached to the PCB of the driving circuit, receives the driving power from the driving circuit, and transmits the driving power to each coil 500 through the harness connector pin 720 and the lead wire.

Particularly, the harness connector 710 has three second coupling grooves at the bottom surface for electrical connection with the substrate connector, and the substrate connector includes three second coupling protrusions corresponding to the second coupling grooves. Thus, the harness connector 710 and the substrate connector may be electrically connected with each other.

Also, the harness connector 710 may include a pin mounting portion 712. Three pin mounting portions 712 are formed on the top surface of the harness connector 710 respectively providing space into which the harness connector pin 720 coupled to the lead wire is inserted and fixed.

In addition, the harness connector 710 may be formed of an electrically insulating material to prevent leakage of current flowing through the lead wire, the harness connector pin 720, and the second coupling protrusion. For example, the harness connector 710 may be formed of a synthetic resin. Also, various other electrically insulating materials may be used to form the harness connector 710.

For example, as illustrated in FIG. 5, the harness connector assembly 700 includes the harness connector pin 720 and the harness connector 710. In a 3-phase 9-slot motor 100, a U-phase wire group 507U may include a first coil wire 517, a fourth coil wire 547, and a seventh coil wire 577, a V-phase wire group 507V may include a second coil wire 527 a fifth coil wire 557, and an eighth coil wire 587, and a W-phase wire group 507W may include a third coil wire 537, a sixth coil wire 567, and a ninth coil wire 597.

The three wires of the U-phase wire group 507U are electrically and mechanically connected to a U-phase pin 723, the three wires of the V-phase wire group 507V are electrically and mechanically connected to a V-phase pin 726, and the three wires of the W-phase wire group 507W are electrically and mechanically connected to a W-phase pin 729.

Each harness connector pin 720 related to the U-phase, the V-phase, and the W-phase is coupled to the harness connector in a state of being inserted into the pin mounting portion 712. That is, the U-phase pin 723 is coupled to the harness connector 710 in a state of being inserted into a U-phase pin mounting portion 713, the V-phase pin 726 is coupled to the harness connector 710 in a state of being inserted into a V-phase pin mounting portion 716, and the W-phase pin 729 is coupled to the harness connector 710 in a state of being inserted into a W-phase pin mounting portion 719.

Hereinafter, a stator according to an exemplary embodiment will be described with reference to FIG. 6.

Figure 6:
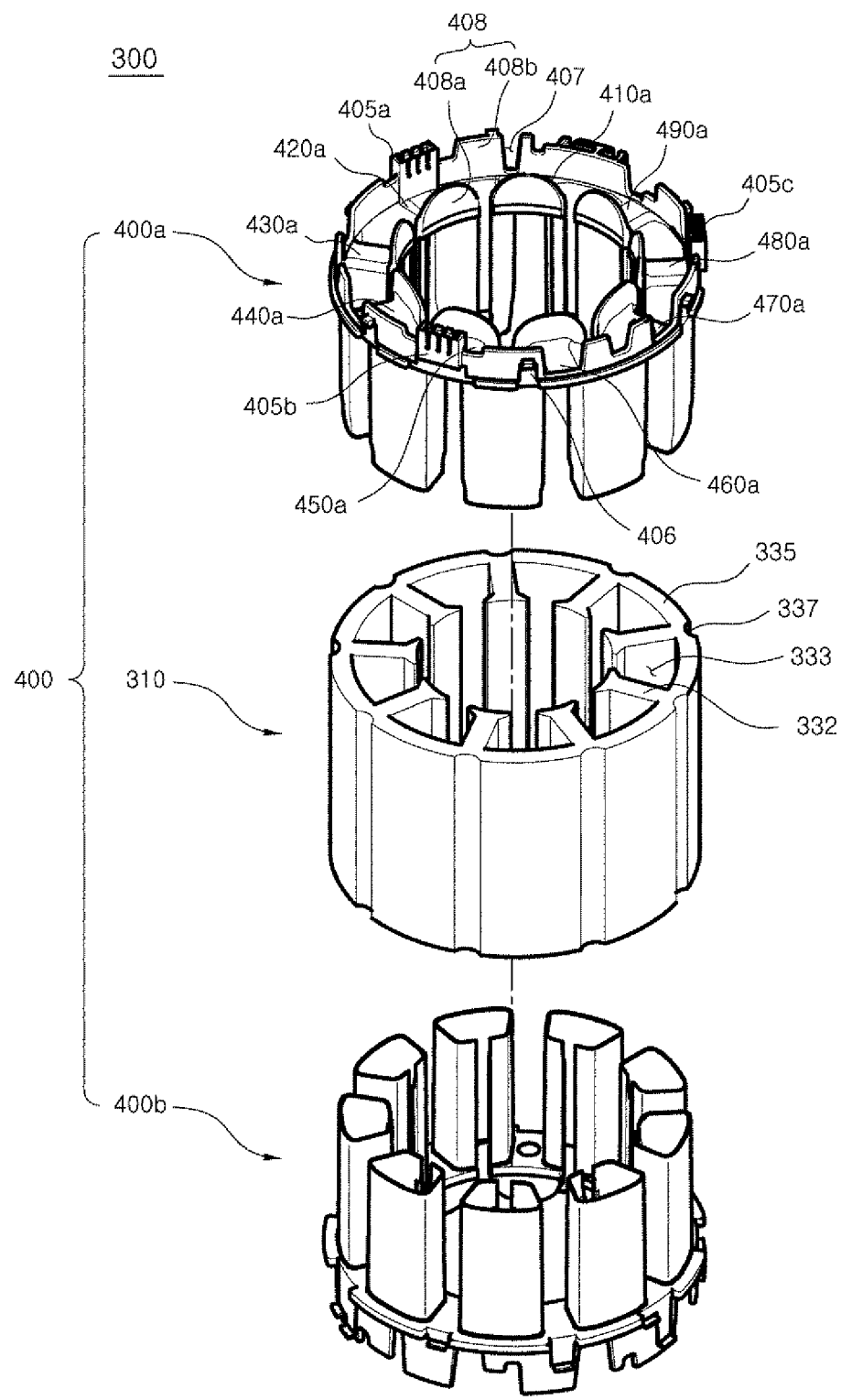
FIG. 6 is an exploded view illustrating a stator according to an embodiment of the present disclosure.

FIG. 6 is an exploded view illustrating a stator according to an embodiment of the present disclosure.

A stator 330 may include a stator core 331 and an insulator 400.

The stator core 331 is formed of a magnetic material that may be magnetized by a magnetic field formed by the coil 500 and includes a hollow cylindrical main core 335, teeth 332 protruding inward from the inner circumferential surface of yokes, and fixing grooves 337 coupled to the motor housing 190 to fix the stator 330.

The stator core 331 will be described in more detail with reference to FIGS. 7 and 8.

The insulator 400 may include a first insulator 400a and a second insulator 400b and may include a non-conductive material to insulate between the teeth 332 and the coil 500.

If connected to the driving circuit through the bus bar assembly 605, the first insulator 400a is coupled to the bus bar housing 620.

The first insulator 400a has hook-holding units at one side to correspond to the stator hook bars 626.

Particularly, the hook-holding units are disposed at positions corresponding to the stator hook bars 626 along the outer circumferential surface of the first insulator 400a.

In more detail, the hook-holding units are disposed at positions corresponding to the slots 333 of the stator core 331. That is, the stator hook bar 626 of the bus bar housing 620, the hook-holding unit of the first insulator 400a, and the slot 333 of the stator core 331 may be disposed to correspond to one another.

In addition, a hook insertion hole into which the stator hook 626a of the stator hook bar 626 is formed at an upper portion of the hook-holding unit. The hook insertion hole has a diameter similar to that of the stator hook bar 626 and smaller than that of the stator hook 626a disposed at one end of the stator hook bar 626.

Also, the hook-holding unit is partially cut near the hook insertion hole, and thus the stator hook 626a having a larger diameter may be inserted into the hook insertion hole having a smaller diameter through the cut portion of the hook-holding unit.

Accordingly, after the stator hook 626a is inserted into the hook insertion hole, the stator hook 626a is not easily separated from the hook insertion hole.

The coil bobbin units 409 may be disposed at the inner circumferential surface of the first insulator 400a at equal intervals to correspond to positions of teeth 332 of the stator core 331.

The coil bobbin unit 409 prevents leakage of driving power caused when the wire of the coil 500 contacts with the stator core 331 and provides a place where the coil 500 is located.

In addition, a plurality of the coil bobbin units 409 may be used in accordance with the number of the teeth 332 or slots 333 of the motor 100. For example, as illustrated in FIG. 6, the coil bobbin unit 409 may include a first coil bobbin unit 410 on which a first coil 510 is formed, a second coil bobbin unit 420 on which a second coil 520 is formed, a third coil bobbin unit 430 on which a third coil 530 is formed, a fourth coil bobbin unit 440 on which a fourth coil 540 is formed, a fifth coil bobbin unit 450 on which a fifth coil 550 is formed, a sixth coil bobbin unit 460 on which a sixth coil 560 is formed, a seventh coil bobbin unit 470 on which a seventh coil 570 is formed, an eighth coil bobbin unit 480 on which an eighth coil 580 is formed, and a ninth coil bobbin unit 490 on which a ninth coil 590 is formed.

In addition, the first coil bobbin unit 410, the fourth coil bobbin unit 440, and the seventh coil bobbin unit 470 may constitute a first coil bobbin unit group 415, the second coil bobbin unit 420, the fifth coil bobbin unit 450, and the eighth coil bobbin unit 480 may constitute a second coil bobbin unit group 425, and the third coil bobbin unit 430, the sixth coil bobbin unit 460, and the ninth coil bobbin unit 490 may constitute a third coil bobbin unit group 435. A U-phase coil 500U, a V-phase coil 500V, and a W-phase coil 500W to which each of 3-phase driving power is supplied may respectively be located on the first coil bobbin unit group 415, the second coil bobbin unit group 425, and the third coil bobbin unit group 435.

The first insulator 400*a* may have a cavity terminal 405 at an outer circumferential surface.

When the coil 500 is prepared by winding a wire on the coil bobbin units 409, the cavity terminal 405 provides wiring space to organize the wire lead out from one coil bobbin unit 309 after being wound thereon to be wound around another coil bobbin unit 409.

In addition, the number of the cavity terminals 405 may be adjusted to correspond to the number of the coil bobbin units 409 included in one coil bobbin unit group. For example, since one coil bobbin unit group includes three coil bobbin units 409 in a 3-phase 9-slot motor 100 as illustrated in FIG. 6, three cavity terminals 405, i.e., a first cavity terminal 405*a*, a second cavity terminal 405*b*, and a third cavity terminal 405*c*, may be used.

The first insulator 400*a* may include a plurality of wire hooks 406 at the outer circumferential surface.

The wire hook 406 is configured to organize and fix the wire exposed to the outer circumferential surface of the first insulator 400*a* by using the cavity terminal 405 in order to wind the wire another coil bobbin unit 409. That is, the wire hook 406 may organize and fix the wire led to the inner circumferential surface of the first insulator 400*a* or led to the outer circumferential surface along a wire hook groove 407 between the cavity terminals 405.

A wire guide unit 408 may be disposed at both sides of the coil bobbin unit 409 to prevent the wire wound on the coil bobbin unit 409 from being deviated outward. In addition, the wire guide unit 408 may include an outer wire guide unit 408*b* disposed at the outer circumferential surface of the first insulator 400*a* and an inner wire guide unit 408*a* disposed at the inner circumferential surface of the first insulator 400*a*.

The wire guide unit 408 protrudes from the top surface of the coil bobbin unit 409 in the axial direction of the stator 330. The wire guide unit 408 bends the wire toward the circumference of the stator 330, thereby preventing the wire from protruding outward or inward from the stator 330.

Hereinafter, a stator and a coil according to an exemplary embodiment will be described with reference to FIGS. 7 and 8.

Figure 7:
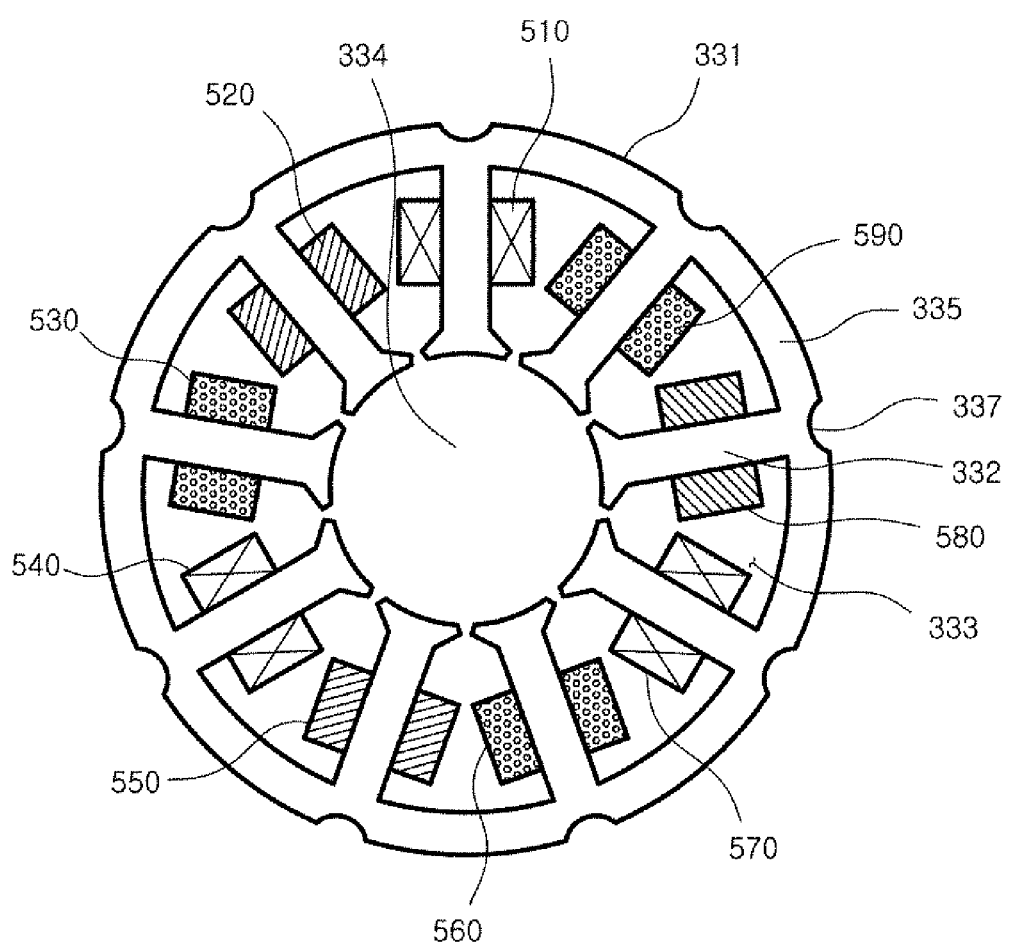
FIG. 7 is a cross-sectional view illustrating a stator and a coil according to an embodiment of the present disclosure.
Figure 8:
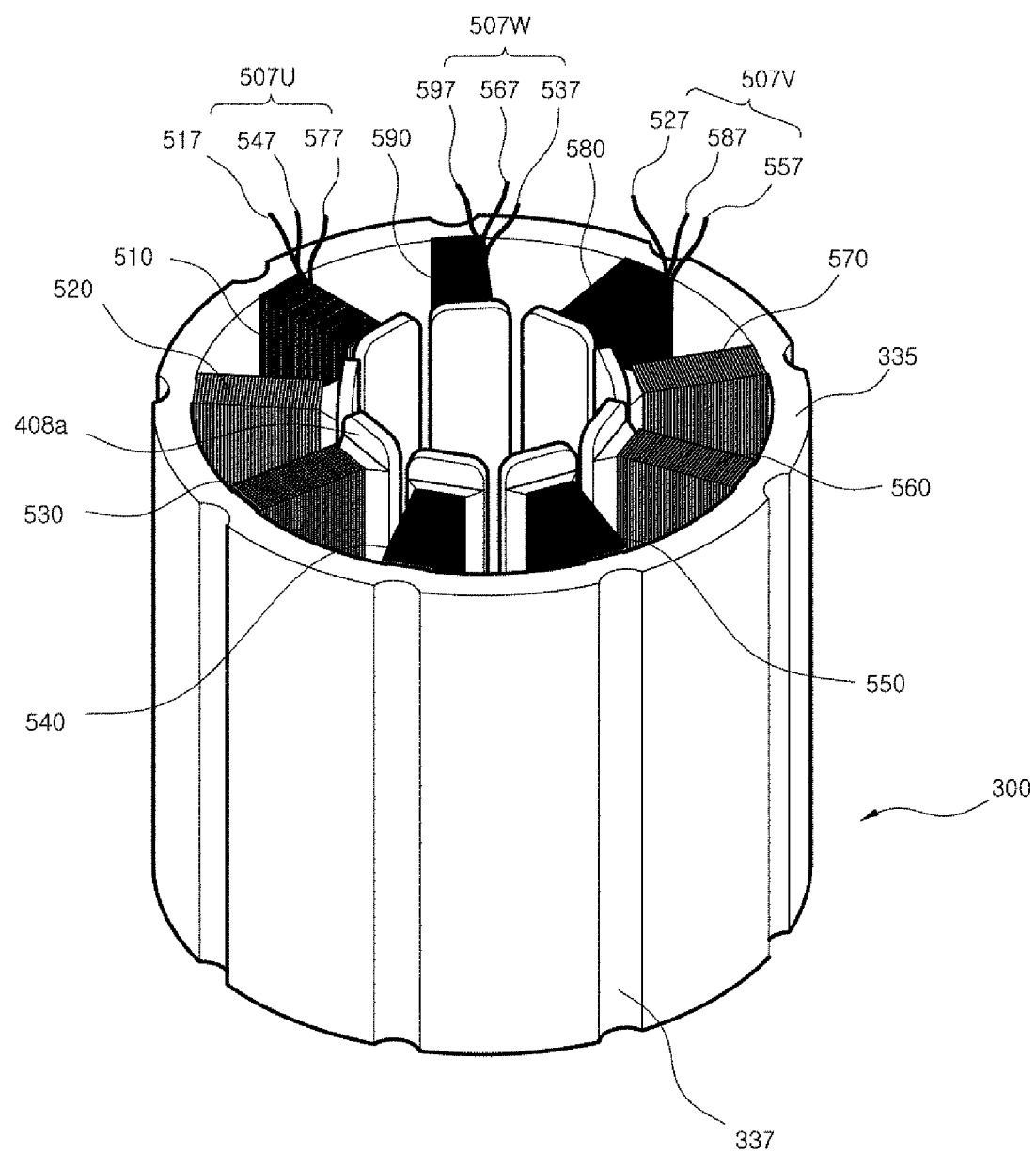
FIG. 8 is a perspective view illustrating a stator and a coil according to an embodiment of the present disclosure.

FIG. 7 is a cross-sectional view illustrating a stator and a coil. FIG. 8 illustrates an appearance of a stator and a coil.

A stator 330 may include a stator core 331.

The stator core 331 may serve as a supporting frame to maintain the shape of the stator 330 and may provide space where the coil 500 is located.

The stator core 331 may include teeth 332, a main core 335, and fixing grooves 337.

The teeth 332 are located in the stator core 331 divided by the main core 335 thereby partitioning the inner space of the stator core 331 into a plurality of slots 333. In addition, the teeth 332 may provide places where the coil 500 is located and may be magnetized to an N-pole or an S-pole by a magnetic field formed by power applied to the coil 500.

Furthermore, each tooth 332 may have a Y-shape and a curved surface adjacent to the rotor 200 among outer surfaces of the tooth 332 for efficient generation of attraction and repulsion with the permanent magnet 280 included in the rotor 200. In addition, various other structures to provide space where the coil 500 is located and to efficiently generate attraction and repulsion with the permanent magnet 280 may also be used in the teeth 332.

The main core 335 constitutes a framework of the stator core 331 maintaining the shape of the stator core 331, and a plurality of teeth 332 may be coupled to the main core 335. The main core 335 may provide a passage in which a magnetic field is formed such that one tooth 332 magnetized by power may lead to induced magnetization of a pair of teeth 332 adjacent to the tooth 332 to have a polarity opposite to that of the tooth 332 magnetized by power.

Also, the main core 335 may have a cylindrical shape. In addition, a plurality of teeth 332 may be disposed at inner portions of the main core 335, and a plurality of fixing grooves 337 may be disposed at outer portions of the main core 335. Furthermore, the main core 335 may have various other structures to maintain the shape of the stator core 335 and to locate the teeth 332 and the fixing grooves 337.

The fixing grooves 337 may provide a fixing force such that the stator 330 is not separated from the motor housing 190 in spite of the rotational force generated by attraction and repulsion between a magnetic field formed by power applied to the coil 500 and a magnetic field formed by the permanent magnet 280.

In addition, the fixing grooves 337 may be formed at an outer barrier wall of the main core 335 to be parallel to the shaft 800 thereby being correspondingly coupled to protrusions of the motor housing 190. In addition, the fixing groove 337 may have various other shapes to fix the stator 330 to the motor housing 190.

The stator core 331 including the teeth 332, the main core 335, and the fixing grooves 337 may be magnetized by power applied to the coil 500 and may be formed of a metallic material or a magnetic material efficiently forming a magnetic field for efficient induced magnetization of adjacent teeth 332. In addition, the stator core 331 may be formed of various other materials magnetized by power applied to the coil 500 and efficiently forming a magnetic field for induced magnetization of adjacent teeth 332.

The coil 500 is disposed on the coil bobbin unit 409 of the insulator 400 disposed on one tooth 332 of the stator core 331 and may form a magnetic field by power applied thereto. Thus, the coil 500 may magnetize the tooth 332 on which the coil 500 is located.

The coil 500 may include a first coil 510, a second coil 520, a third coil 530, a fourth coil 540, a fifth coil 550, a sixth coil 560, a seventh coil 570, an eighth coil 580, and a ninth coil 590. In the coil 500, the first coil 510 is illustrated at an upper portion of FIG. 7, and the second coil 520, the third coil 530, the fourth coil 540, the fifth coil 550, the sixth coil 560, the seventh coil 570, the eighth coil 580, and the ninth coil 590 may be sequentially disposed counter-clockwise. That is, the first coil 510 is positioned at the 12 o'clock position, and the second coil 520, the third coil 530, the fourth coil 540, the fifth coil 550, the sixth coil 560, the seventh coil 570, the eighth coil 580, and the ninth coil 590 may be sequentially disposed counter-clockwise at intervals of 40 degrees.

In addition, lead wires wound to form the coil 500 and lead out therefrom are connected to a driving point port PP of each phase, and driving power of each phase may be supplied thereto.

For example, a first coil wire 517 that is one end of the wire wound on the first coil 510 and lead out therefrom, a fourth coil wire 547 that is one end of the wire wound on the fourth coil 540 and lead out therefrom, and a seventh coil wire 577 that is one end of the wire wound on the seventh coil 570 and lead out therefrom may be drawn out from the same position. The first coil wire 517, the fourth coil wire 547, and the seventh coil wire 577 drawn out from the same position may constitute a U-phase wire group 507U and may be connected to a U-phase driving point port UPP. Thus, U-phase driving power may be supplied to the U-phase wire group 507U through the U-phase driving point port UPP.

Also, a second coil wire 527 that is one end of the wire wound on the second coil 520 and lead out therefrom, a fifth coil wire 557 that is one end of the wire wound on the fifth coil 550 and lead out therefrom, and an eighth coil wire 587 that is one end of the wire wound on the eighth coil 580 and lead out therefrom may be drawn out from the same position. The second coil wire 527, the fifth coil wire 557, and the eighth coil wire 587 drawn out from the same position may constitute a V-phase wire group 507V and may be connected to a V-phase driving point port VPP. Thus, V-phase driving power may be supplied to the V-phase wire group 507V through the V-phase driving point port VPP.

Also, a third coil wire 537 that is one end of the wire wound on the third coil 530 and lead out therefrom, a sixth coil wire 567 that is one end of the wire wound on the sixth coil 560 and lead out therefrom, and a ninth coil wire 597 that is one end of the wire wound on the ninth coil 590 and lead out therefrom may be drawn out from the same position. The third coil wire 537, the sixth coil wire 567, and the ninth coil wire 597 drawn out from the same position may constitute a W-phase wire group 507W and may be connected to a W-phase driving point port WPP. Thus, W-phase driving power may be supplied to the W-phase wire group 507W through the W-phase driving point port WPP.

Power supplied to the coil 500 may be 3-phase power. Thus, in this case, U-phase power may be supplied to the first coil 510, the fourth coil 540, and the seventh coil 570, V-phase power may be supplied to the second coil 520, the fifth coil 550, and the eighth coil 580, and W-phase power may be supplied to the third coil 530, the sixth coil 560, and the ninth coil 590.

In addition, various combinations of the coil 500 for the control of the rotation of the rotor 200 and for efficient acting of attraction and repulsion between the magnetic field formed by the rotor 200 and the magnetic field formed by the stator 330 may also be used.

In addition, a concentrated winding may be applied to a method of forming the coil 500 on the teeth 332. The concentrated winding refers to a winding of coils of one phase under one pole are concentrated in the one slot. Various other methods for efficiently magnetizing the teeth 332 may also be used as a winding method of the coil 500 on the coil bobbin unit 409.

A method of forming the coil 500 by winding a wire on the coil bobbin unit 409 will be described in detail with reference to FIGS. 10 to 18.

Finally, a material used to form the coil 500 may include copper (Cu), aluminum (Al), or a Cu—Al composite material. However, various other materials for efficiently magnetizing the teeth 332 may also be used to form the coil 500.

The configuration of the motor is described above.

Hereinafter, a method of manufacturing a motor by forming a coil by winding a wire according to an exemplary embodiment will be described.

Figure 9:
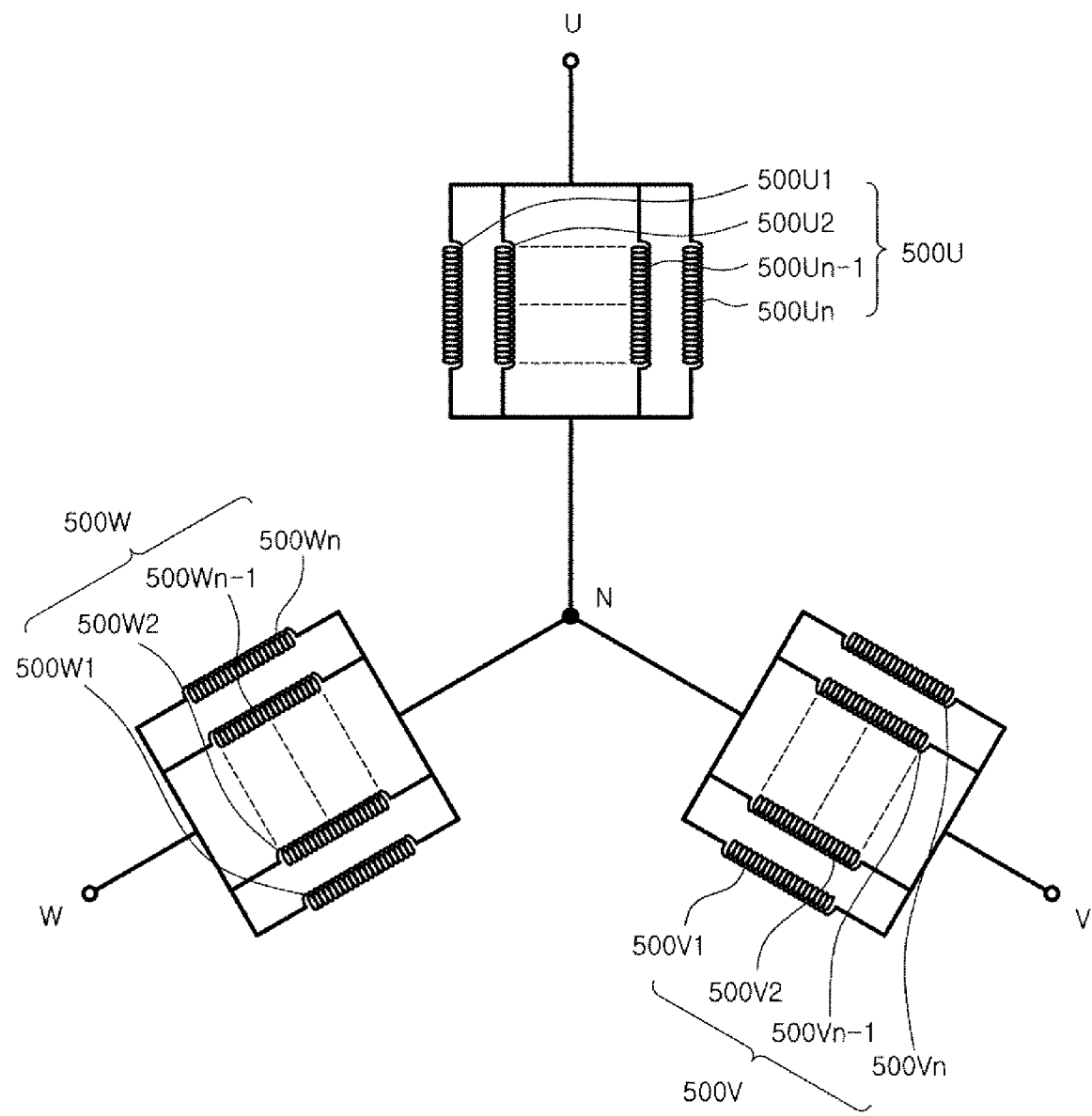
FIG. 9 illustrates a concept of a 3-phase parallel pattern of a plurality of coils according to an embodiment of the present disclosure.

FIG. 9 illustrates a concept of a 3-phase parallel pattern of a plurality of coils.

Referring to FIG. 9, a plurality of coils connected to each phase in parallel forms a Y connection as illustrated in FIG. 9. A plurality of coils of each phase indicates one coil wound on each of the coil bobbin units 409, and a plurality of coils of the same phase illustrated in parallel indicates a plurality of coils disposed at every third coil bobbin units 409 from one coil bobbin unit 409 clockwise.

Particularly, the U-phase coil 500U includes a U-phase first coil 500U1 to a U-phase nth coil 500Un, each connected in parallel, the V-phase coil 500V a V-phase first coil 500V1 to a V-phase nth coil 500Vn, each connected in parallel, and the W-phase coil 500W includes a W-phase first coil 500W1 to a W-phase nth coil 500Wn, each connected in parallel.

In addition, since one end of the U-phase coil 500U is a driving point U, one end of each of the n U-phase coils 500U is connected to the U-phase driving point port UPP. Since one end of the V-phase coil 500V is a driving point V, one end of each of the n V-phase coils 500V is connected to the V-phase driving point port VPP. Since one end of the W-phase coil 500W is a driving point W, each of the n W-phase coil 500W is connected to the W-phase driving point port WPP. In addition, since the other end of each of the U-phase coil 500U, the V-phase coil 500V, and the W-phase coil 500W is a neutral points N, the other end of each of the 3n coils is connected to the neutral point port NP.

Hereinafter, a process of winding one wire on each of the coil bobbin groups and cutting the wire according to an exemplary embodiment will be described with reference to FIGS. 10 and 11.

Figure 10:
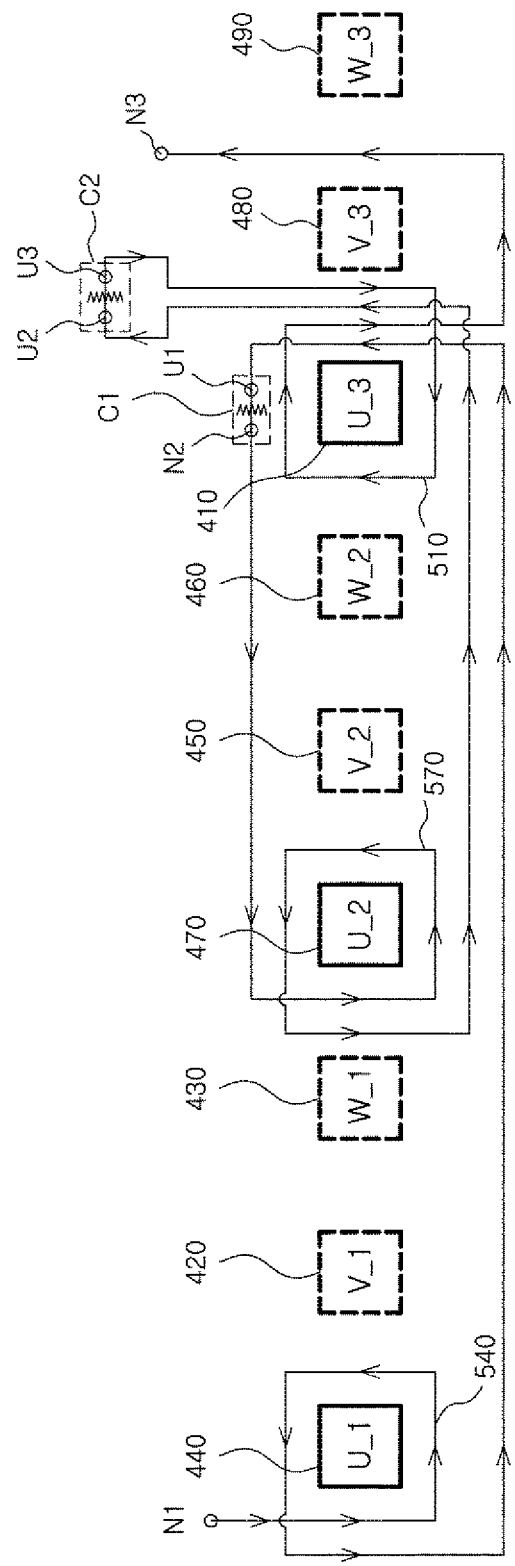
FIG. 10 illustrates a concept of winding one wire on a U-phase coil bobbin unit group according to an embodiment of the present disclosure.

FIG. 10 illustrates a concept of winding one wire on the U-phase coil bobbin unit group. As illustrated in FIG. 10, when the motor 100 is a 3-phase 9-slot motor 100, each phase includes three coils 500. Thus, the U-phase first coil bobbin unit 410, fourth coil bobbin unit 440, and seventh coil bobbin unit 470, the V-phase second coil bobbin unit 420, fifth coil bobbin unit 450, and eighth coil bobbin unit 480, and the W-phase third coil bobbin unit 430, sixth coil bobbin unit 460, and ninth coil bobbin unit 490 are aligned.

In order to prepare the U-phase coil 500U by winding a wire on the U-phase coil bobbin units and cutting the wire at a cutting point, the wire from a first neutral point N1 is wound on the fourth coil bobbin unit 440 clockwise or counterclockwise by a predetermined number of windings to prepare the fourth coil 540, and then the wire is organized to pass by the first coil bobbin unit 410 and is wound on the seventh coil bobbin unit 470 in the same direction as in the fourth coil bobbin unit 440 by the predetermined number of windings to prepare the seventh coil 570.

Then, the wire led out from the seventh coil bobbin unit 470 is organized to pass by one portion of a first U-phase driving point U1 of the first coil bobbin unit 410 and then pass by another portion of the first U-phase driving point U1 of the first coil bobbin unit 410.

Then, the wire is wound on the first coil bobbin unit 410 in a direction opposite to that of the fourth coil bobbin unit 440 and the seventh coil bobbin unit 470 by the predetermined number of windings to prepare the first coil 510, and the winding is terminated while setting the end of the wire as a third neutral point N3.

In this regard, the predetermined number of windings is a value determined according to output of power of a product to which the motor 100 is applied, target output of power desired by a user or a manufacturer, energy efficiency, and the like. Besides, various other factors determining the predetermined number of windings may also be used.

In this regard, the wire is wound on the first coil bobbin unit 410 in the direction opposite to the direction of the wire wound in the fourth coil bobbin unit 440 and the seventh coil bobbin unit 470 to prepare the first coil 510 in order to dispose the U-phase driving point U near the last coil wound on the U-phase coil bobbin unit group. Thus, the aforementioned description is not limited to the case in which the wire is wound on the first coil bobbin unit 410 in the opposite direction.

In addition, the wire connecting the fourth coil 540 and the seventh coil 570 is cut at a first cutting point C1 near the first coil 510, and an end of the cut wire of the seventh coil 570 side is set as a second neutral point N2, and an end of the cut wire of the fourth coil 540 side is set as a first U-phase driving point U1.

Also, the wire connecting the seventh coil 570 and the first coil 510 is cut at a second cutting point C2 near the first coil 510, and an end of the cut wire of the seventh coil 570 side is set as a second U-phase driving point U2, and an end of the cut wire of the first coil 510 side is set as a third U-phase driving point U3.

In addition, the end of the wire led out from the first coil 510 is set as a third neutral point N3.

Figure 11:
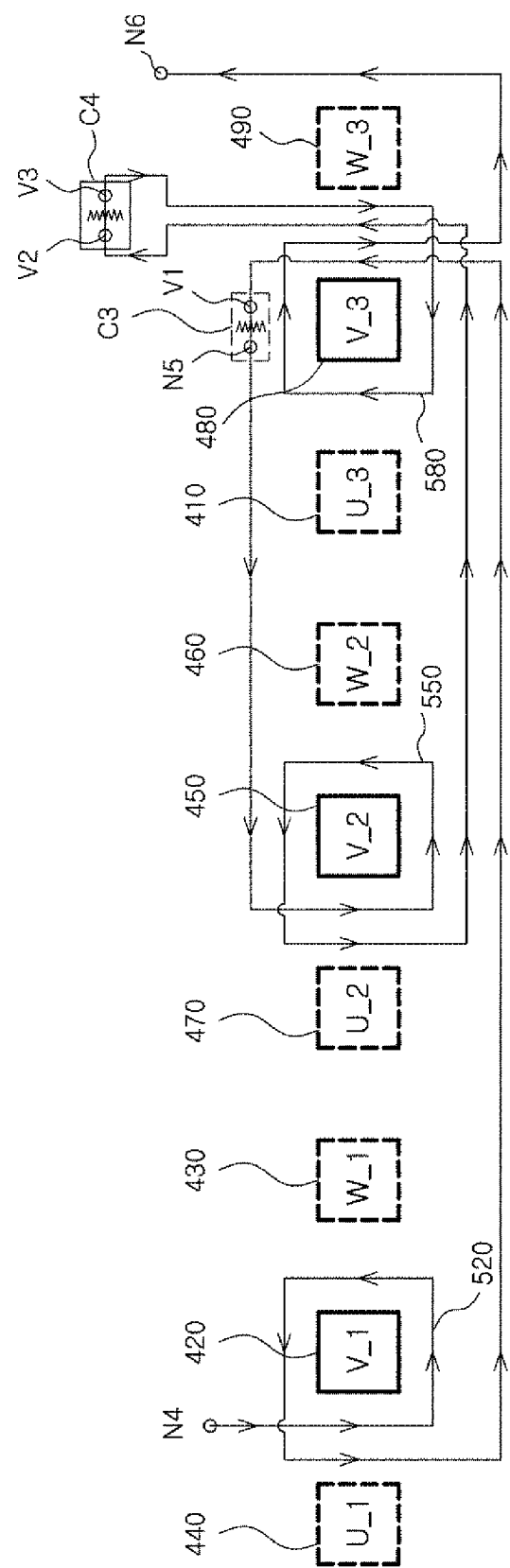
FIG. 11 illustrates a concept of winding one wire on a V-phase coil bobbin unit group according to an embodiment of the present disclosure.

FIG. 11 illustrates a concept of winding one wire on the V-phase coil bobbin unit group. As illustrated in FIG. 11, when the motor 100 is a 3-phase 9-slot motor 100, each phase includes three coils 500. Thus, the U-phase first coil bobbin unit 410, fourth coil bobbin unit 440, and seventh coil bobbin unit 470, the V-phase second coil bobbin unit 420, fifth coil bobbin unit 450, and eighth coil bobbin unit 480, and the W-phase third coil bobbin unit 430, sixth coil bobbin unit 460, and ninth coil bobbin unit 490 are aligned.

In order to prepare the V-phase coil 500U by winding a wire on the V-phase coil bobbin units and cutting the wire at a cutting point, a wire from a fourth neutral point N4 is wound on the second coil bobbin unit 420 clockwise or counterclockwise by a predetermined number of windings to prepare the second coil 520, and then the wire is organized to pass by the eighth coil bobbin unit 480 and is wound on the fifth coil bobbin unit 450 in the same direction as in the second coil bobbin unit 420 by the predetermined number of windings to prepare the fifth coil 550.

Then, the wire led out from the fifth coil bobbin unit 450 is organized to pass by one portion of a first V-phase driving point V1 of the eighth coil bobbin unit 480 and then pass by another portion of the first V-phase driving point V1 of the eight coil bobbin unit 480.

Then, the wire is wound on the eight coil bobbin unit 480 in a direction opposite to that of the second coil bobbin unit 420 and the fifth coil bobbin unit 450 by the predetermined number of windings to prepare the eighth coil 580, and the winding is terminated while setting the end of the wire as a sixth neutral point N6.

In this regard, the predetermined number of windings is a value determined according to output of power of a product to which the motor 100 is applied, target output of power desired by a user or a manufacturer, energy efficiency, and the like. Besides, various other factors determining the predetermined number of windings may also be used.

In this regard, the wire is wound on the eighth coil bobbin unit 480 in the direction opposite to the direction of the wire wound in the second coil bobbin unit 420 and the fifth coil bobbin unit 450 to prepared the eighth coil 580 in order to dispose the V-phase driving point V near the last coil wound on the V-phase coil bobbin unit group. Thus, the aforementioned description is not limited to the case in which the wire is wound on the eighth coil bobbin unit 480 in the opposite direction.

In addition, the wire connecting the second coil 520 and the fifth coil 550 is cut at a third cutting point C3 near the eighth coil 580, and an end of the cut wire of the fifth coil 550 side is set as a fifth neutral point N5, and an end of the cut wire of the second coil 520 side is set as a first V-phase driving point V1.

Also, the wire connecting the fifth coil 550 and the eighth coil 580 is cut at a fourth cutting point C4 near the eighth coil 580, and an end of the cut wire of the fifth coil 550 side is set as a second V-phase driving point V2, and an end of the cut wire of the eighth coil 580 side is set as a third V-phase driving point V3.

In addition, the end of the wire led out from the eighth coil 580 is set as a third neutral point N3.

Figure 12:
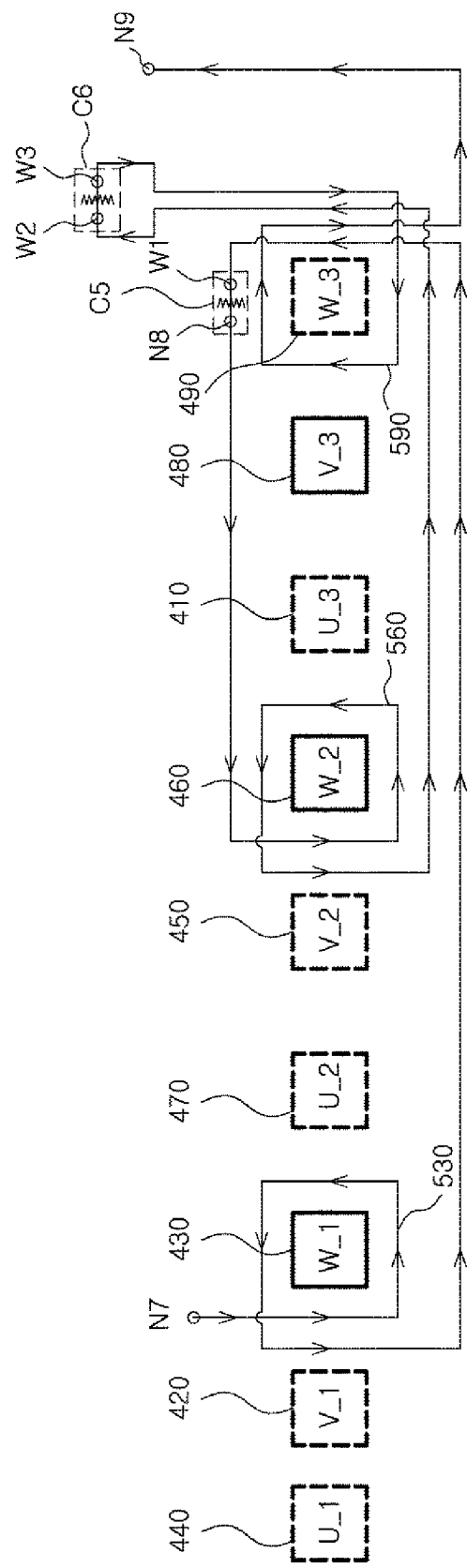
FIG. 12 illustrates a concept of winding one wire on a W-phase coil bobbin unit group according to an embodiment of the present disclosure.

FIG. 12 illustrates a concept of winding one wire on the W-phase coil bobbin unit group. As illustrated in FIG. 12, when the motor 100 is a 3-phase 9-slot motor 100, each phase includes three coils 500. Thus, the U-phase first coil bobbin unit 410, fourth coil bobbin unit 440, and seventh coil bobbin unit 470, the V-phase second coil bobbin unit 420, fifth coil bobbin unit 450, and eighth coil bobbin unit 480, and the W-phase third coil bobbin unit 430, sixth coil bobbin unit 460, and ninth coil bobbin unit 490 are aligned.

In order to prepare the W-phase coil 500W by winding a wire on the W-phase coil bobbin units and cutting the wire at a cutting point, a wire from a seventh neutral point N7 is wound on the third coil bobbin unit 430 clockwise or counterclockwise by a predetermined number of windings to prepare the third coil 530, and then the wire is organized to pass by the ninth coil bobbin unit 490 and is wound on the sixth coil bobbin unit 460 in the same direction as in the third coil bobbin unit 430 by the predetermined number of windings to prepare the sixth coil 560.

In addition, the wire led out from the sixth coil bobbin unit 460 is organized to pass by one portion of a first W-phase driving point W1 of the ninth coil bobbin unit 490 and then pass by another portion of the first W-phase driving point W1 of the ninth coil bobbin unit 490.

Then, the wire is wound on the ninth coil bobbin unit 490 in a direction opposite to that of the third coil bobbin unit 430 and the sixth coil bobbin unit 460 by the predetermined number of windings to prepare the ninth coil 590, and the winding is terminated while setting the end of the wire as a ninth neutral point N9.

In this regard, the predetermined number of windings is a value determined according to output of power of a product to which the motor 100 is applied, target output of power desired by a user or a manufacturer, energy efficiency, and the like. Besides, various other factors determining the predetermined number of windings may also be used.

In this regard, the wire is wound on the ninth coil bobbin unit 490 in the direction opposite to the direction of the wire wound in the third coil bobbin unit 430 and the sixth coil bobbin unit 460 to prepared the ninth coil 580 in order to dispose the W-phase driving point W near the last coil wound on the W-phase coil bobbin unit group. Thus, the aforementioned description is not limited to the case in which the wire is wound on the ninth coil bobbin unit 490 in the opposite direction.

In addition, the wire connecting the third coil 530 and the sixth coil 560 is cut at a fifth cutting point C5 near the ninth coil 590, and an end of the cut wire of theسسسsixth coil 560 side is set as an eighth neutral point N8, and an end of the cut wire of the third coil 530 side is set as a first W-phase driving point W1.

Also, the wire connecting the sixth coil 560 and the ninth coil 590 is cut at a sixth cutting point C6 near the ninth coil 590, and an end of the cut wire of the sixth coil 560 side is set as a second W-phase driving point W2, and an end of the cut wire of the ninth coil 590 side is set as a third W-phase driving point W3.

In addition, the end of the wire led out from the ninth coil 590 is set as a ninth neutral point N9.

Hereinafter, a process of winding one wire on three coil bobbin groups and cutting the wire according to an exemplary embodiment will be described with reference to FIG. 13.

Figure 13:
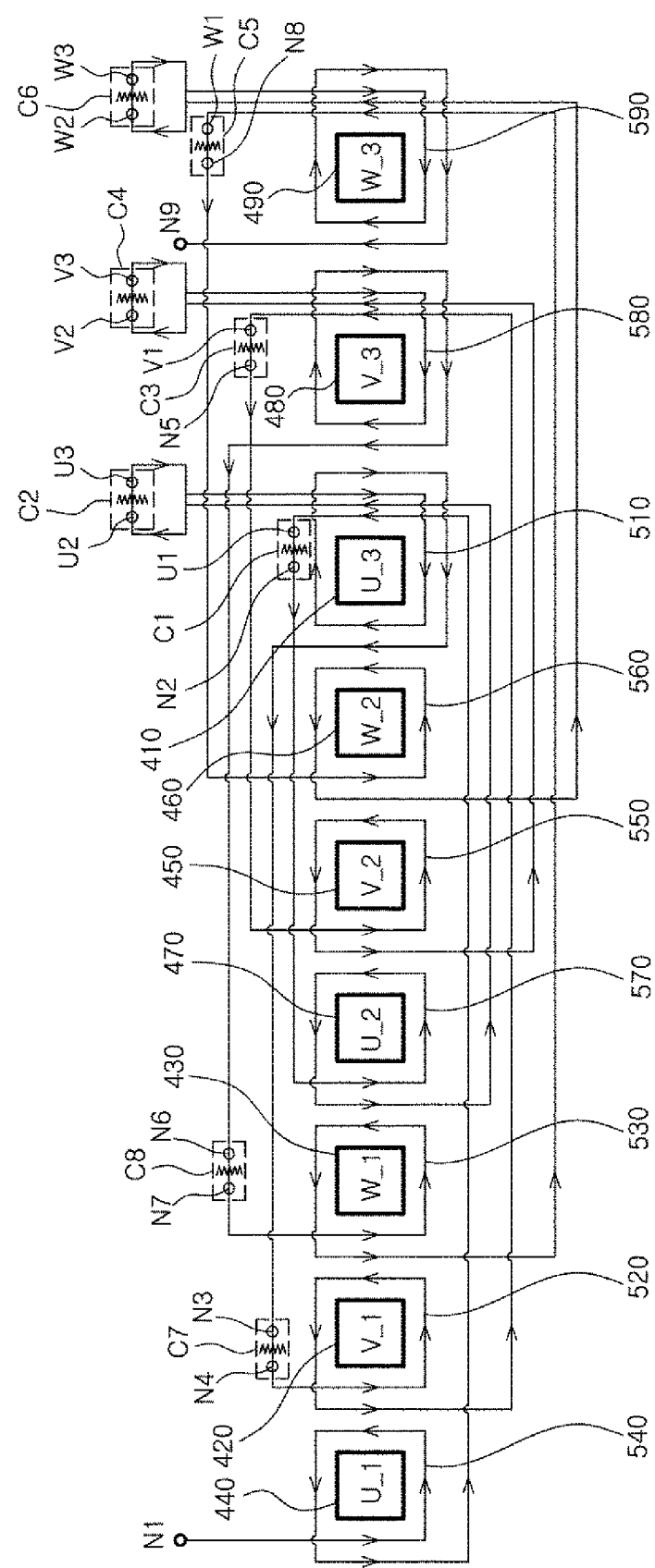
FIG. 13 illustrates a concept of winding one wire on three coil bobbin unit groups according to an embodiment of the present disclosure.

FIG. 13 illustrates a concept of winding one wire on three coil bobbin unit groups.

As illustrated in FIG. 13, when the motor 100 is a 3-phase 9-slot motor 100, each phase includes three coils 500. Thus, the U-phase first coil bobbin unit 410, fourth coil bobbin unit 440, and seventh coil bobbin unit 470, the V-phase second coil bobbin unit 420, fifth coil bobbin unit 450, and eighth coil bobbin unit 480, and the W-phase third coil bobbin unit 430, sixth coil bobbin unit 460, and ninth coil bobbin unit 490 are aligned.

First, a method of preparing coils by winding one wire on each of the nine coil bobbin units will be described. A wire from a first neutral point N1 is wound on the fourth coil bobbin unit 440 clockwise or counterclockwise by a predetermined number of windings to prepare the fourth coil 540, and then the wire is organized to pass by the first coil bobbin unit 410 and is wound on the seventh coil bobbin unit 470 in the same direction as in the fourth coil bobbin unit 440 by the predetermined number of windings to prepare the seventh coil 570.

In addition, the wire led out from the seventh coil bobbin unit 470 is organized to pass by one portion of a first U-phase driving point U1 of the first coil bobbin unit 410 and then pass by another portion of the first U-phase driving point U1 of the first coil bobbin unit 410.

Then, the wire is wound on the first coil bobbin unit 410 in a direction opposite to that of the fourth coil bobbin unit 440 and the seventh coil bobbin unit 470 by the predetermined number of windings to prepare the first coil 510.

Then, the wire led out from a first coil bobbin unit 410 is wound on the second coil bobbin unit 420 clockwise or counterclockwise by a predetermined number of windings to prepare the second coil 520, and then the wire is organized to pass by the eighth coil bobbin unit 480 and is wound on the fifth coil bobbin unit 450 in the same direction as in the second coil bobbin unit 420 by the predetermined number of windings to prepare the fifth coil 550.

In addition, the wire led out from the fifth coil bobbin unit 450 is organized to pass by one portion of a first V-phase driving point V1 of the eighth coil bobbin unit 480 and then pass by another portion of the first V-phase driving point V1 of the eight coil bobbin unit 480.

Then, the wire is wound on the eight coil bobbin unit 480 in a direction opposite to that of the second coil bobbin unit 420 and the fifth coil bobbin unit 450 by the predetermined number of windings to prepare the eighth coil 580.

Then, the wire led out from the eighth coil bobbin unit 480 is wound on the third coil bobbin unit 430 clockwise or counterclockwise by a predetermined number of windings to prepare the third coil 530, and then the wire is organized to pass by the ninth coil bobbin unit 490 and is wound on the sixth coil bobbin unit 450 in the same direction as in the third coil bobbin unit 430 by the predetermined number of windings to prepare the sixth coil 560.

In addition, the wire led out from the sixth coil bobbin unit 460 is organized to pass by one portion of a first W-phase driving point W1 of the ninth coil bobbin unit 490 and then pass by another portion of the first W-phase driving point W1 of the ninth coil bobbin unit 490.

Then, the wire is wound on the ninth coil bobbin unit 490 in a direction opposite to that of the third coil bobbin unit 430 and the sixth coil bobbin unit 460 by the predetermined number of windings to prepare the ninth coil 590, and the winding is terminated while setting the end of the wire as a ninth neutral point N9.

In this regard, the predetermined number of windings is a value determined according to output of power of a product to which the motor 100 is applied, target output of power desired by a user or a manufacturer, energy efficiency, and the like. Besides, various other factors determining the predetermined number of windings may also be used.

However, the order of winding one wire on the 3-phase coil bobbin units to form the coils is not limited to the order of the U-phase, V-phase, and W-phase described above. The winding order may vary according to the position of the cavity terminal 405, the position of the driving point port PP or the neutral point port NP, manufacturing efficiency, and the coil bobbin unit.

Here, the winding direction of the wire on the first coil bobbin unit 410, the eighth coil bobbin unit 480, and the ninth coil bobbin unit 490 is opposite to the winding direction of the wire on the other coil bobbin units in order to dispose the driving point P of each phase near the last coil by winding the last coil in the opposite direction. Thus, the aforementioned description is not limited to the case of winding the wire on the first coil bobbin unit 410, the eighth coil bobbin unit 480, and the ninth coil bobbin unit 490 in the opposite direction.

Next, a method of setting neutral points N and driving points P by cutting the wire will be described. The wire connecting the fourth coil 540 and the seventh coil 570 is cut at a first cutting point C1 near the first coil 510, and an end of the cut wire of the seventh coil 570 side is set as a second neutral point N2, and an end of the cut wire of the fourth coil 540 side is set as a first U-phase driving point U1.

The wire connecting the seventh coil 570 and the first coil 510 is cut at a second cutting point C2 near the first coil 510, and an end of the cut wire of the seventh coil 570 side is set as a second U-phase driving point U2, and an end of the cut wire of the first coil 510 side is set as a third U-phase driving point U3.

The wire connecting the first coil 510 and the second coil 520 is cut at a seven cutting point C7 near the second coil 520, and an end of the cut wire of the first coil 510 side is set as a third neutral point N3, and an end of the cut wire of the second coil 520 side is set as a fourth neutral point N4.

The wire connecting the second coil 520 and the fifth coil 550 is cut at a third cutting point C3 near the eighth coil 580, and an end of the cut wire of the fifth coil 550 side is set as a fifth neutral point N5, and an end of the cut wire of the second coil 520 side is set as a first V-phase driving point V1.

The wire connecting the fifth coil 550 and the eighth coil 580 is cut at a fourth cutting point C4 near the eighth coil 580, and an end of the cut wire of the fifth coil 550 side is set as a second V-phase driving point V2, and an end of the cut wire of the eighth coil 580 side is set as a third V-phase driving point V3.

The wire connecting the eighth coil 580 and the third coil 530 is cut at an eighth cutting point C8 near the third coil 530, and an end of the cut wire of the eighth coil 580 side is set as a sixth neutral point N6, and an end of the cut wire of the third coil 530 side is set as a seventh neutral point N7.

The wire connecting the third coil 530 and the sixth coil 560 is cut at a fifth cutting point C5 near the ninth coil 590, and an end of the cut wire of the sixth coil 560 side is set as an eighth neutral point N8, and an end of the cut wire of the third coil 530 side is set as a first W-phase driving point W1.

The wire connecting the sixth coil 560 and the ninth coil 590 is cut at a sixth cutting point C6 near the ninth coil 590, and an end of the cut wire of the sixth coil 560 side is set as a second W-phase driving point W2, and an end of the cut wire of the ninth coil 590 side is set as a third W-phase driving point W3.

In addition, the end of the wire led out from the ninth coil 590 is set as a ninth neutral point N9.

Hereinafter, a method of connecting neutral points and driving points with each port according to an exemplary embodiment will be described with reference to FIG. 14.

Figure 14:
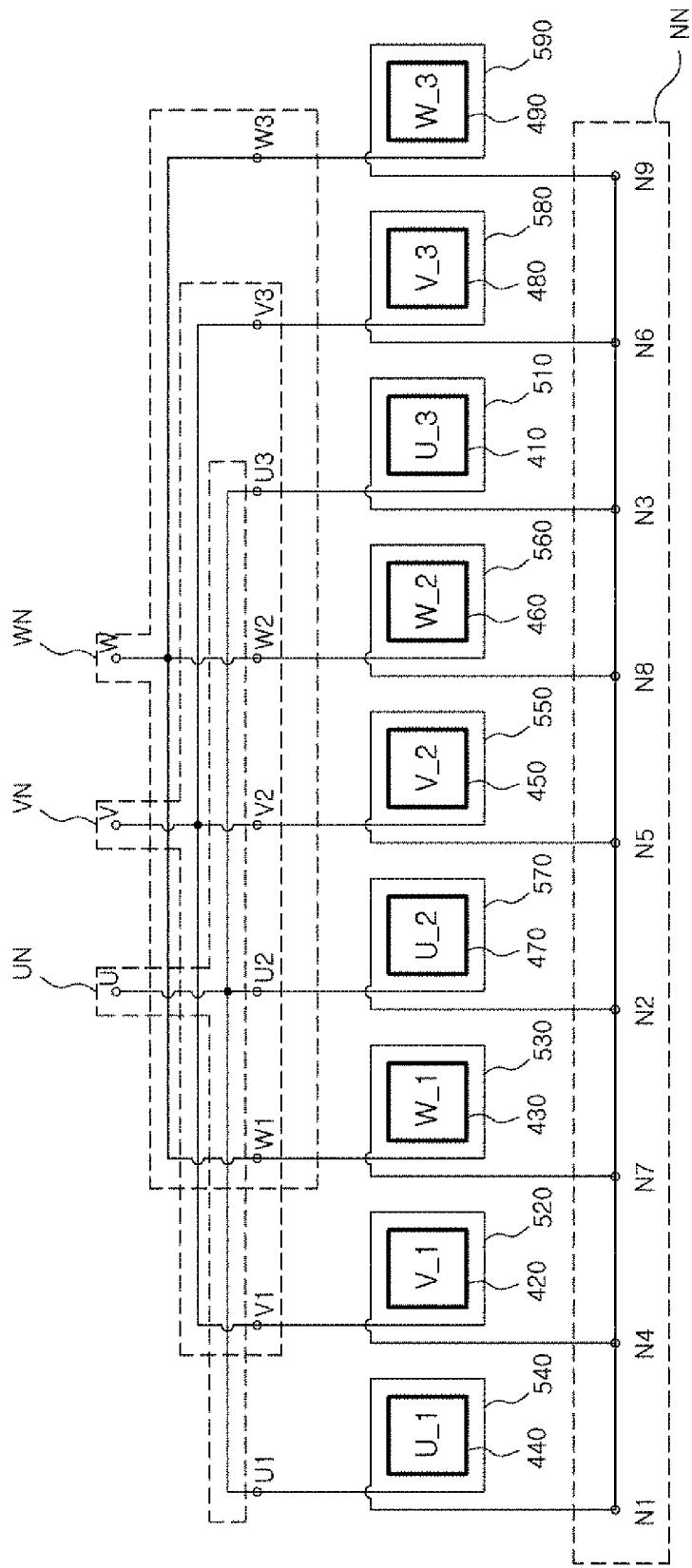
FIG. 14 illustrates a concept of respectively connecting both ends of a wound wire to a neutral point port and a driving point port according to an embodiment of the present disclosure.

FIG. 14 illustrates a concept of respectively connecting both ends of a wound wire respectively to a neutral point port and a driving point port.

When the coil 500 is prepared by winding one wire on the coil bobbin units and the driving points P and the neutral points N are set by cutting the wire as described above with reference to FIGS. 10 to 13, the 9 driving points P and 9 neutral points N should be connected to the driving point ports PP of each phase and the neutral point ports NP.

As illustrated in FIG. 14, all of the first U-phase driving point U1 that is one end of the fourth coil 540, the second U-phase driving point U2 that is one end of the seventh coil 570, and the third U-phase driving point U3 that is one end of the first coil 510 are connected and set as a U-phase driving node UN, and the U-phase driving node UN is connected to a U-phase driving point port UPP of the bus bar assembly 605 or the harness connector assembly 700.

Also, all of the first V-phase driving point V1 that is one end of the second coil 520, the second V-phase driving point V2 that is one end of the fifth coil 550, and the third V-phase driving point V3 that is one end of the eighth coil 580 are connected and set as a V-phase driving node VN, and the V-phase driving node VN is connected to a V-phase driving point port VPP of the bus bar assembly 605 or the harness connector assembly 700.

All of the first W-phase driving point W1 that is one end of the third coil 530, the second W-phase driving point W2 that is one end of the sixth coil 560, and the third W-phase driving point W3 that is one end of the ninth coil 590 are connected and set as a W-phase driving node WN, and the W-phase driving node WN is connected to a W-phase driving point port WPP of the bus bar assembly 605 or the harness connector assembly 700.

In addition, all of a first neutral point N1 that is the other end of the fourth coil 540, a second neutral point N2 that is the other end of the seventh coil 570, a third neutral point N3 that is the other end of the first coil 510, a fourth neutral point N4 that is the other end of the second coil 520, a fifth neutral point N5 that is the other end of the seventh coil 570, a sixth neutral point N6 that is the other end of the eighth coil 580, a seventh neutral point N7 that is the other end of the third coil 530, an eighth neutral point N8 that is the other end of the sixth coil 560, and a ninth neutral point N9 that is the other end of the ninth coil 590 are connected and set a neutral node NN, or respectively connected to the neutral point port NP.

Hereinafter, a method of winding one wire on each of the coil bobbin groups and cutting the wire according to an exemplary embodiment will be described with reference to FIGS. 15 and 16.

Figure 15:
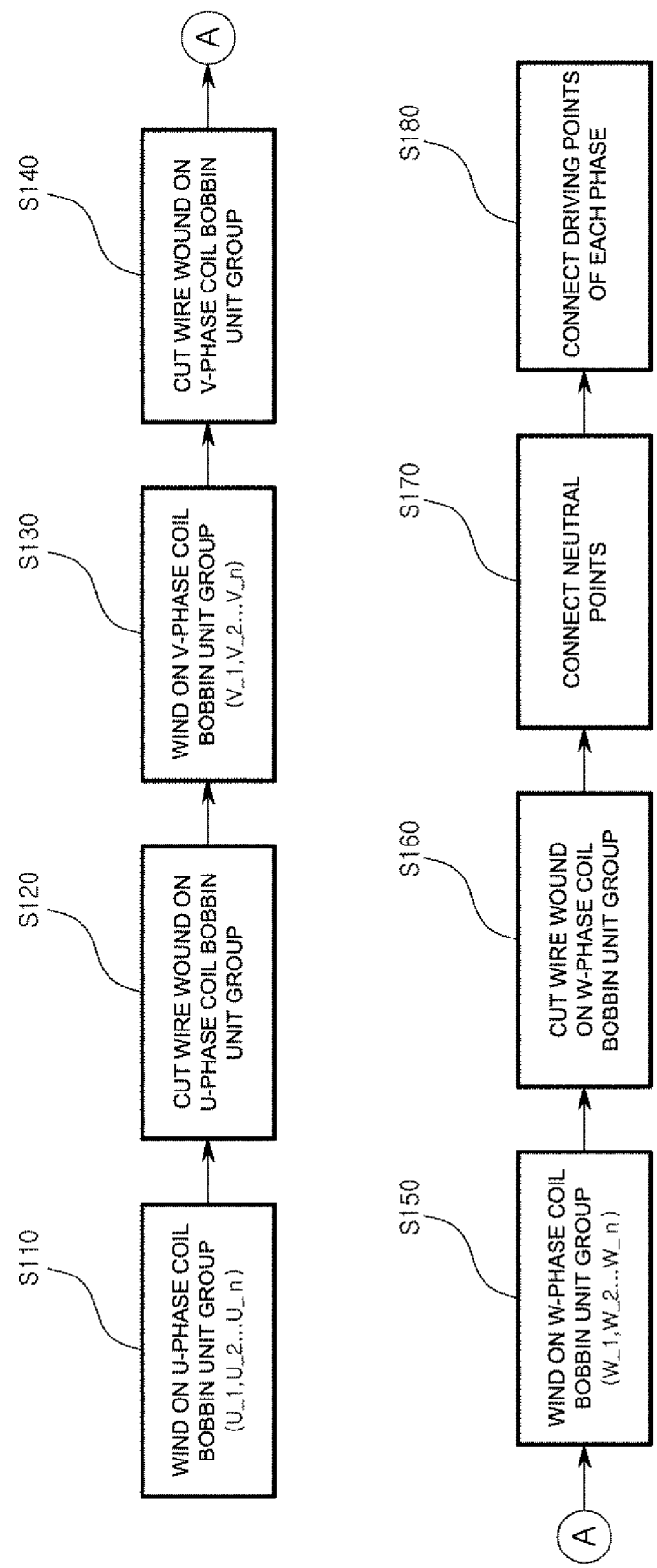
FIG. 15 illustrates a concept of winding one wire on one coil bobbin unit group and cutting the wire.

FIG. 15 illustrates a concept of winding one wire on one coil bobbin unit group and cutting the wire.

Referring to a method of manufacturing a 3-phase n-slot motor, as illustrated in FIG. 15, one wire is wound on the U-phase coil bobbin unit group in series to prepare n coils (S110), and the wire is cut at cutting points to convert the series pattern of the U-phase coil group into a parallel pattern (S120).

Then, one wire is wound on the V-phase coil bobbin unit group in series to prepare n coils (S130), and the wire is cut at cutting points to convert the series pattern of the V-phase coil group into a parallel pattern (S140).

Then, one wire is wound on the W-phase coil bobbin unit group in series to prepare n coils (S150), and the wire is cut at cutting points to convert the series pattern of the W-phase coil group into a parallel pattern (S160).

Then, in order to complete the pattern conversion of the each phase coil group into a parallel pattern, 3n neutral points are connected to a neutral point port (S170). In order to connect the driving points of each phase (S180), n U-phase driving points are connected to a U-phase driving point port, n V-phase driving points are connected to a V-phase driving point port, and n W-phase driving points are connected to a W-phase driving point port.

Particularly, a method of connecting wires of a 3-phase 9-slot motor will be described with reference to FIG. 16.

Figure 16A:
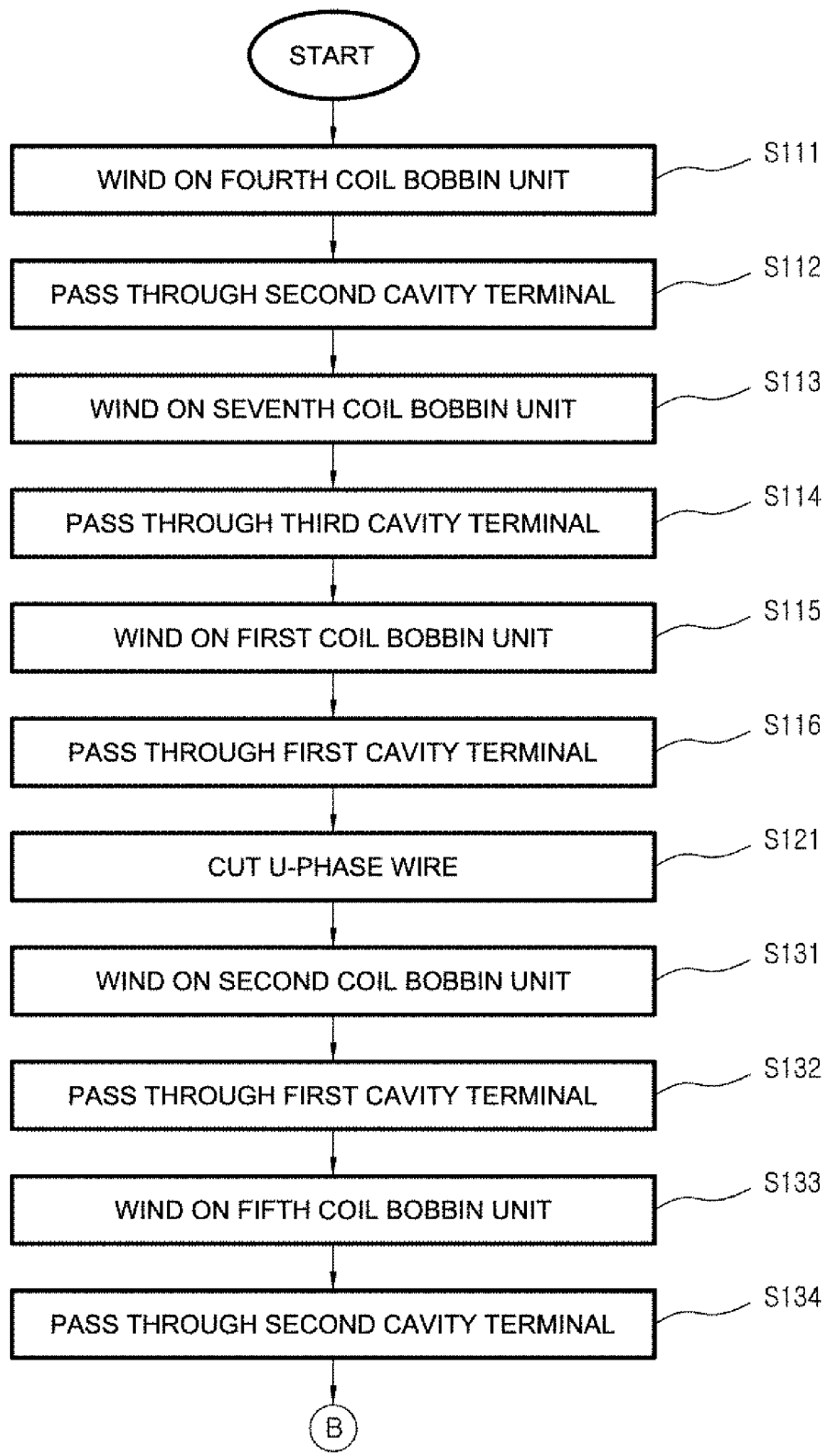
FIG. 16 is a flowchart illustrating a process of winding one wire on three coil bobbin units of one coil bobbin unit group and cutting the wire.

FIG. 16 is a flowchart illustrating a process of winding one wire on three coil bobbin units of one coil bobbin unit group and cutting the wire.

First, in order to prepare a U-phase coil, a wire is wound on a fourth coil bobbin unit to prepare a fourth coil (S111), and the wire led out from the fourth coil bobbin unit is organized near a seventh coil bobbin unit by passing the wire through a second cavity terminal (S112).

Then, the wire drawn out from the second cavity terminal is wound on the seventh coil bobbin unit to prepare a seventh coil (S113), and the wire led out from the seventh coil bobbin unit is organized near a first coil bobbin unit by passing the wire through a third cavity terminal (S114).

Then, the wire drawn out from the third cavity terminal is wound on the first coil bobbin unit to prepare a first coil (S115), and the wire led out from the first coil bobbin unit is passed through a first cavity terminal (S116).

Then, the prepared U-phase wire is cut at predetermined cutting points (S121).

Next, in order to prepare a V-phase coil, a wire is wound on a second coil bobbin unit to prepare a second coil (S131), and the wire led out from the second coil bobbin unit is organized near a fifth coil bobbin unit by passing the wire through the first cavity terminal (S132).

Then, the wire drawn out from the first cavity terminal is wound on the fifth coil bobbin unit to prepare a fifth coil (S133), and the wire led out from the fifth coil bobbin unit is organized near an eighth coil bobbin unit by passing the wire through a second cavity terminal (S134).

Then, the wire drawn out from the second cavity terminal is wound on the eighth coil bobbin unit to prepare an eighth coil (S135), and the wire led out from the eighth coil bobbin unit is passed through a third cavity terminal (S136).

Then, the prepared V-phase wire is cut at predetermined cutting points (S141).

Next, in order to prepare a W-phase coil, a wire is wound on a third coil bobbin unit to prepare a third coil (S151), and the wire led out from the third coil bobbin unit is organized near a sixth coil bobbin unit by passing the wire through the second cavity terminal (S152).

Then, the wire drawn out from the second cavity terminal is wound on the sixth coil bobbin unit to prepare a sixth coil (S153), and the wire led out from the sixth coil bobbin unit is organized near a ninth coil bobbin unit by passing the wire through the third cavity terminal (S154).

Then, the wire drawn out from the third cavity terminal is wound on the ninth coil bobbin unit to prepare a ninth coil (S155), and the wire led out from the ninth coil bobbin unit is passed through the first cavity terminal (S156).

Then, the prepared W-phase wire is cut at predetermined cutting points (S161).

In order to complete the 3-phase parallel pattern of the 9 coils, one ends of the 9 coils are connected to form a neutral point, and the neutral point is connected to a neutral point port (S171), and the other ends of the 9 coils are connected to respectively form a driving point of each phase, and the driving points are connected to driving point ports (S181).

Hereinafter, a process of winding one wire on three coil bobbin groups and cutting the wire according to an exemplary embodiment will be described with reference to FIGS. 17 and 18.

Figure 17:
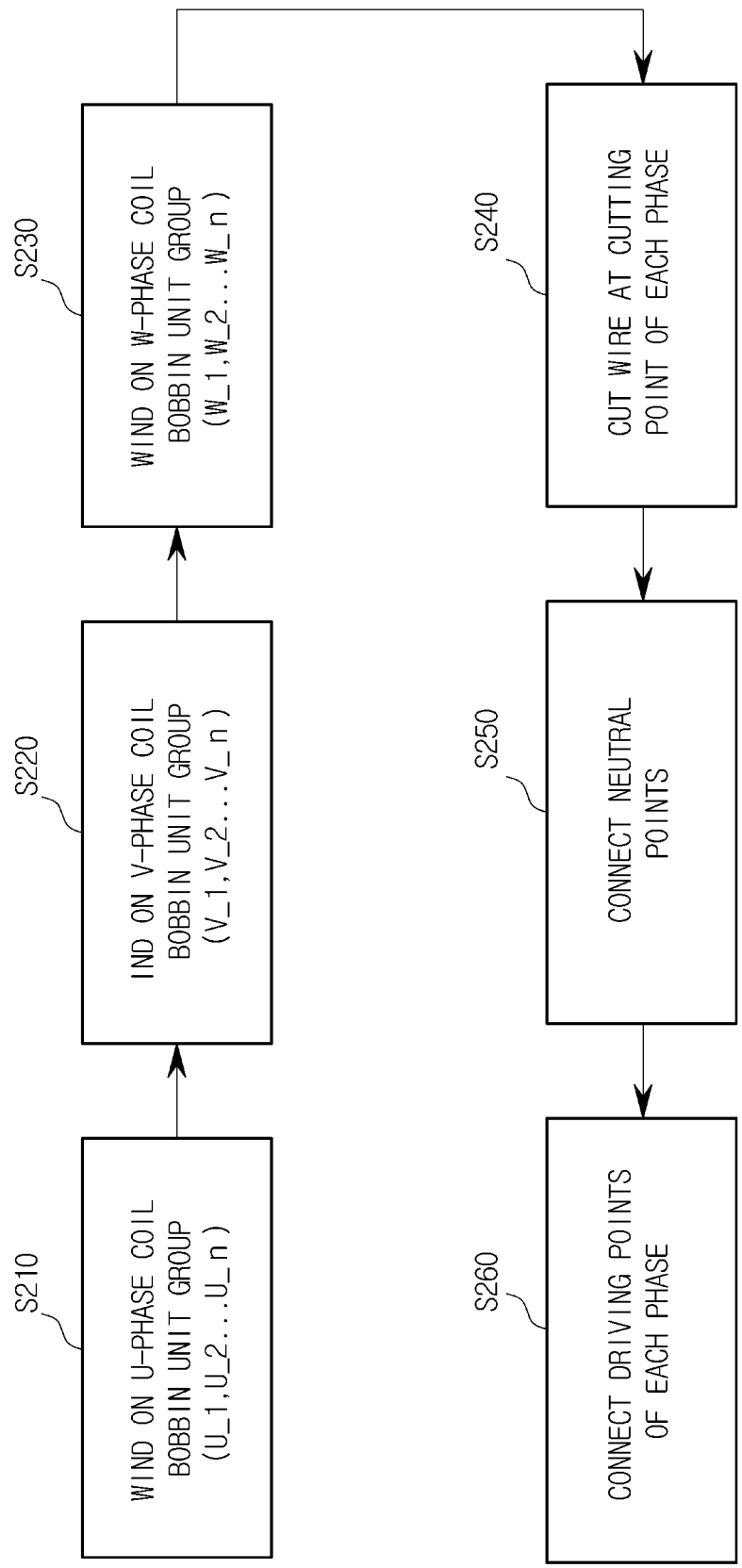
FIG. 17 illustrates a concept of winding one wire on three coil bobbin unit groups and cutting the wire.

FIG. 17 illustrates a concept of winding one wire on three coil bobbin unit groups and cutting the wire.

A method of manufacturing a 3-phase n-slot motor 100 will be described. As illustrated in FIG. 17, one wire is wound on coil bobbin units of the U-phase coil group in series to prepare n coils (S210), the wire led out from the U-phase coil group is wound on coil bobbin units of the V-phase coil group in series to prepare n coils (S220), and the wire led out from the V-phase coil group is wound on coil bobbin units of the W-phase coil group in series to prepare n coils (S230).

Then, for conversion of the series pattern of each phase to a parallel pattern, the wire of each phase is cut at predetermined cutting points (S240).

Then, in order to convert the pattern of the each phase coil group into a parallel pattern, 3n neutral points are connected to a neutral point port (S250). In order to connect the driving points of each phase (S260), n U-phase driving points are connected to a U-phase driving point port, n V-phase driving points are connected to a V-phase driving point port, and n W-phase driving points are connected to a W-phase driving point port.

Particularly, a method of connecting a 3-phase 9-slot motor will be described with reference to FIGS. 18A and 18B.

Figure 18A:
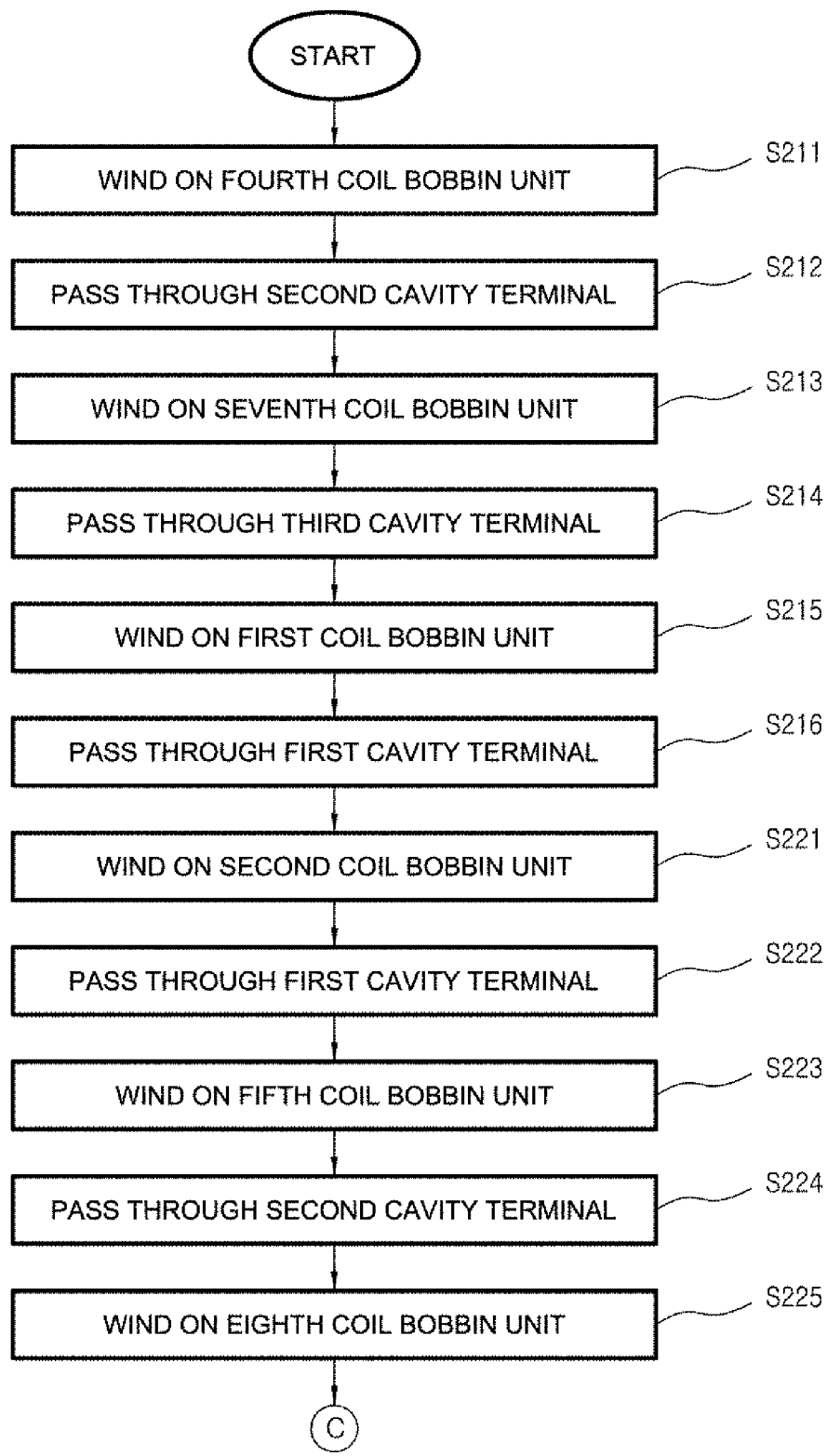
FIGS. 18A and 18B are flowcharts illustrating a process of winding one wire on three coil bobbin units of each of the three coil bobbin unit groups and cutting the wire.
Figure 18B:
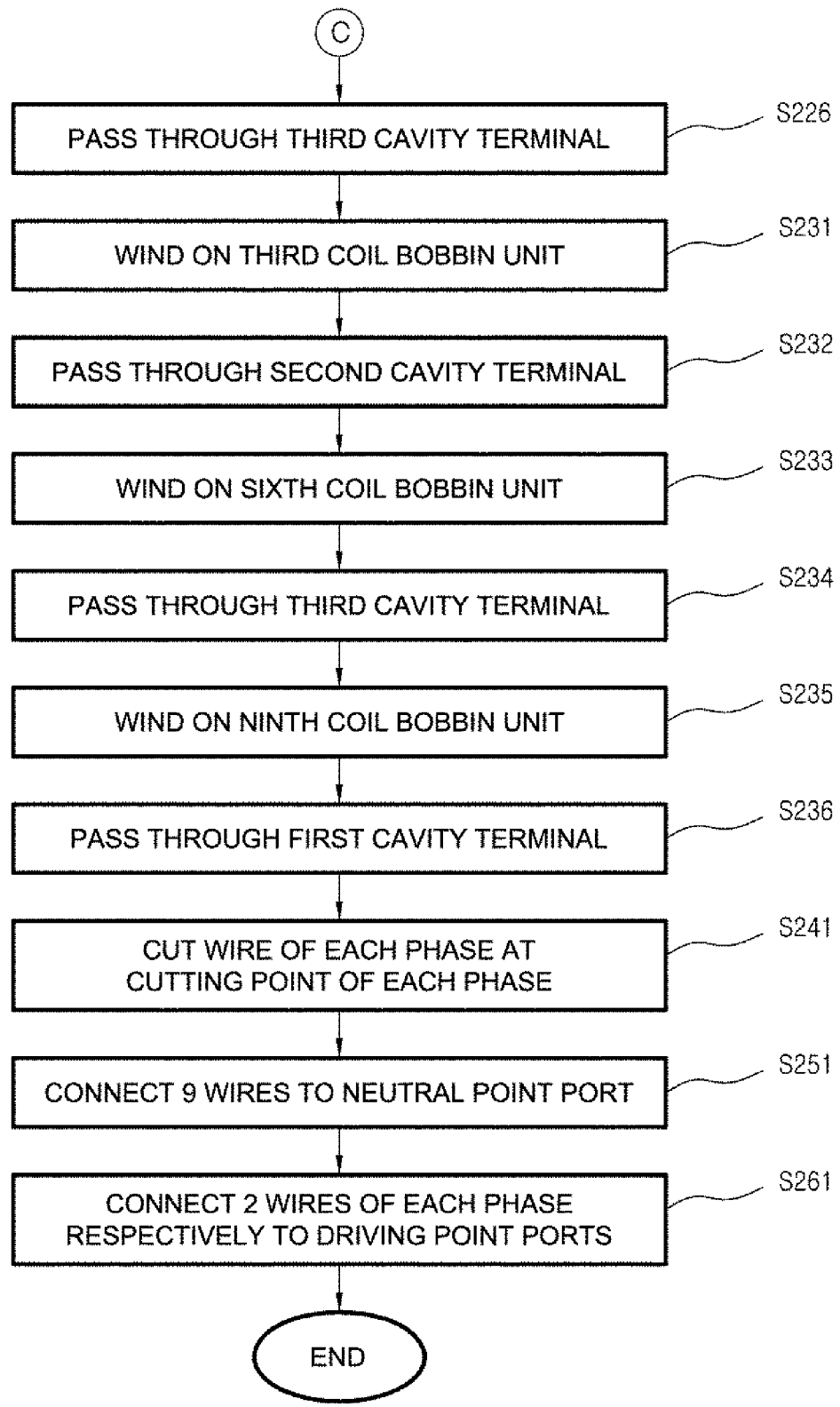

FIGS. 18A and 18B are flowcharts illustrating a process of winding one wire on three coil bobbin units of each of the three coil bobbin unit groups and cutting the wire.

First, in order to prepare a U-phase coil, a wire is wound on a fourth coil bobbin unit to prepare a fourth coil (S211), and the wire led out from the fourth coil bobbin unit is organized near a seventh coil bobbin unit by passing the wire through a second cavity terminal (S212).

Then, the wire drawn out from the second cavity terminal is wound on the seventh coil bobbin unit to prepare a seventh coil (S213), and the wire led out from the seventh coil bobbin unit is organized near a first coil bobbin unit by passing the wire through a third cavity terminal (S214).

Then, the wire drawn out from the third cavity terminal is wound on the first coil bobbin unit to prepare a first coil (S215), and the wire led out from the first coil bobbin unit is organized near a second coil bobbin unit by passing the wire through a first cavity terminal (S216).

Next, in order to prepare a V-phase coil, a wire drawn out from the first cavity terminal is wound on the second coil bobbin unit to prepare a second coil (S221), and the wire led out from the second coil bobbin unit is organized near a fifth coil bobbin unit by passing the wire through the first cavity terminal (S222).

Then, the wire drawn out from the first cavity terminal is wound on the fifth coil bobbin unit to prepare a fifth coil (S223), and the wire led out from the fifth coil bobbin unit is organized near an eighth coil bobbin unit by passing the wire through a second cavity terminal (S224).

Then, the wire drawn out from the second cavity terminal is wound on the eighth coil bobbin unit to prepare an eighth coil (S225), and the wire led out from the eighth coil bobbin unit is organized near a third coil bobbin unit by passing the wire through a third cavity terminal (S226).

Next, in order to prepare a W-phase coil, a wire drawn out from the third cavity terminal is wound on the third coil bobbin unit to prepare a third coil (S231), and the wire led out from the third coil bobbin unit is organized near a sixth coil bobbin unit by passing the wire through the second cavity terminal (S152).

Then, the wire drawn out from the second cavity terminal is wound on the sixth coil bobbin unit to prepare a sixth coil (S223), and the wire led out from the sixth coil bobbin unit is organized near a ninth coil bobbin unit by passing the wire through the third cavity terminal (S234).

Then, the wire drawn out from the third cavity terminal is wound on the ninth coil bobbin unit to prepare a ninth coil (S235), and the wire led out from the ninth coil bobbin unit is passed through the first cavity terminal (S236).

Then, the prepared wire of each phase is cut at predetermined cutting points (S241).

Then, in order to complete the 3-phase parallel pattern of the 9 coils, one ends of the 9 coils are connected as a neutral point and connected to a neutral point port (S251), and the other ends of the 3 phase coils are connected as driving points and respectively connected to driving point ports (S261).

As apparent from the above description, according to the motor and the method of manufacturing the motor, wires may be efficiently organized and the working process may be simplified by converting the series pattern of the wires into a parallel pattern and locating driving points connected to the driving point port of each phase to be adjacent to each phase.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:
1. A motor comprising:
a rotor;
a stator comprising a plurality of coil bobbin unit groups, wherein the plurality of coil bobbin unit groups comprises three coil bobbin unit groups, and each of the coil bobbin unit groups comprises at least three coil bobbin units;
a bus bar assembly; and
a coil including a wire wound sequentially on coil bobbin units of each coil bobbin unit group, the wound wire being cut at a cutting point to form a parallel pattern, having one end of the cut wire connected to a neutral point port on the bus bar assembly, and having the other end of the cut wire connected to a driving point port on the bus bar assembly,
wherein the wire on the last coil bobbin unit of each coil bobbin unit group is wound in a direction opposite to a winding direction of the other two coil bobbin units, and
wherein the wire is cut at a cutting point adjacent to a first coil bobbin unit of each coil bobbin unit group on which the wire is first wound and a last coil bobbin unit of the coil bobbin unit group on which the wire is last wound, wherein wires lead out from each of the coil bobbin units by cutting, are grouped in parallel into a U-phase wire group, a V-phase wire group, and a W-phase wire group, and wherein wires of each wire group are withdrawn from a same position.

2. The motor according to claim 1, wherein the coil is prepared by winding one wire on a plurality of coil bobbin unit groups and cutting the wire.

3. The motor according to claim 1, wherein the coil is prepared by winding one wire on one coil bobbin unit group and cutting the wire, and winding another wire on another coil bobbin unit group.

4. The motor according to claim 1, wherein among the three coil bobbin unit groups, a first coil bobbin unit group comprises a first coil bobbin unit, a fourth coil bobbin unit, and a seventh coil bobbin unit, a second coil bobbin unit group comprises a second coil bobbin unit, a fifth coil bobbin unit, and an eighth coil bobbin unit, and a third coil bobbin unit group comprises a third coil bobbin unit, a sixth coil bobbin unit, and a ninth coil bobbin unit.

5. The motor according to claim 4, wherein the coil is prepared by sequentially winding the wire on the first coil bobbin unit group, the second coil bobbin unit group, and the third coil bobbin unit group.

6. The motor according to claim 5, wherein the coil is prepared by sequentially winding the wire on the fourth coil bobbin unit, the seventh coil bobbin unit, the first coil bobbin unit, the second coil bobbin unit, the fifth coil bobbin unit, the eighth coil bobbin unit, the third coil bobbin unit, the sixth coil bobbin unit, and the ninth coil bobbin unit.

* * * * *